United States Patent [19]

Hoshido

[11] 4,106,064
[45] Aug. 8, 1978

[54] CASSETTE-TYPE RECORDING AND/OR REPRODUCING APPARATUS WITH INADVERTENT ERASE PREVENTING DEVICE

[75] Inventor: Mutsuo Hoshido, Kashiwa, Japan

[73] Assignee: Sony Corporation, Tokyo, Japan

[21] Appl. No.: 754,169

[22] Filed: Dec. 27, 1976

[30] Foreign Application Priority Data

Dec. 25, 1975 [JP] Japan .................... 50-174372[U]

[51] Int. Cl.$^2$ ................. G11B 15/04; G11B 21/20
[52] U.S. Cl. ................................. 360/60; 360/105
[58] Field of Search ............... 360/60, 137, 105, 66, 360/96

[56] References Cited

U.S. PATENT DOCUMENTS

| | | | |
|---|---|---|---|
| 3,037,093 | 5/1962 | Nowlan | 360/60 |
| 3,752,486 | 8/1973 | Nakamura | 360/60 |
| 3,940,800 | 2/1976 | Tabuchi | 360/60 |
| 4,003,087 | 1/1977 | Iwasaki | 360/60 |
| 4,005,480 | 1/1977 | Matsumoto | 360/60 |

*Primary Examiner*—Jay P. Lucas
*Attorney, Agent, or Firm*—Lewis H. Eslinger; Alvin Sinderbrand

[57] ABSTRACT

In an apparatus for recording and/or reproducing signals on a magnetic tape contained in a cassette having at least one aperture which is alternatively obstructed or unobstructed to respectively indicate that signals may be recorded on the tape or that the tape already has signals recorded thereon which are not to be erased; a detector is engageable with an operatively positioned cassette at the aperture of the latter and has first and second states in dependence on whether the aperture is obstructed or unobstructed, respectively, a record push-button is actuable from a rest position to an operative position with the detector in either of its states, and a change-over mechanism changes-over the apparatus to its recording mode of operation in response to actuation of the record push-button only when the detector is in its first state. An ejector is also provided for ejecting the tape cassette from its operative position in response to actuation of the record push-button with the detector in its second state. Further, a lock, which is normally operative to hold the actuated record push-button in its operative position, is released in response to the second state of the detector, and an indicator is made operative to indicate that the operatively positioned cassette has an unobstructed aperture in response to the actuation of the record push-button with the detector in its second state.

22 Claims, 18 Drawing Figures

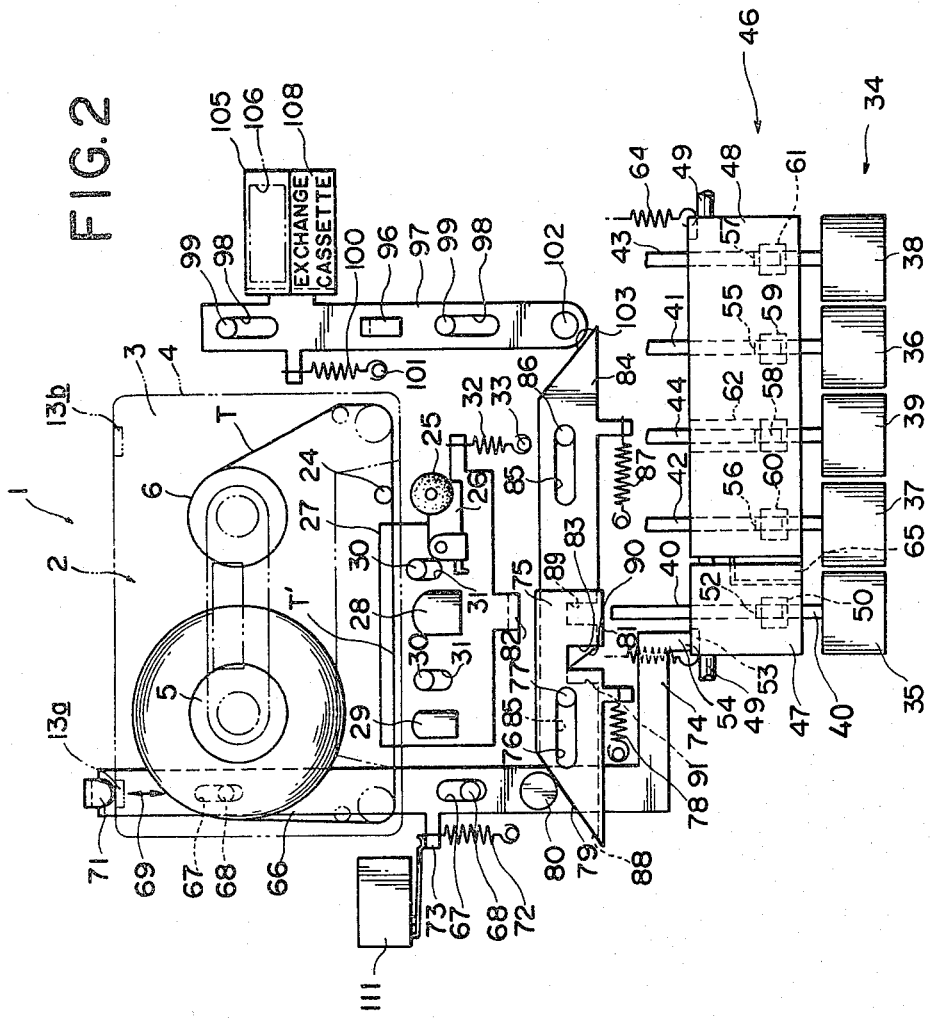

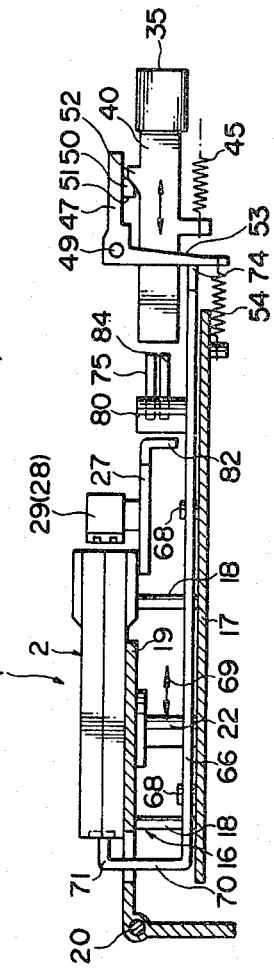
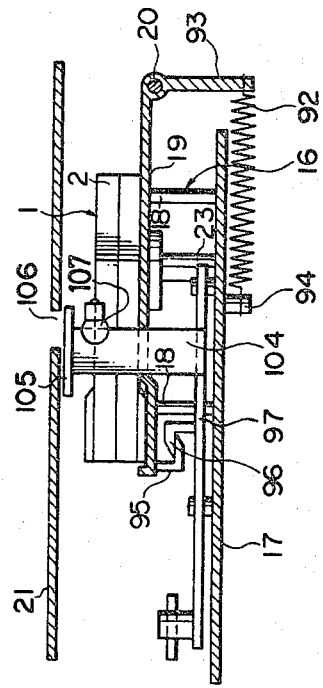

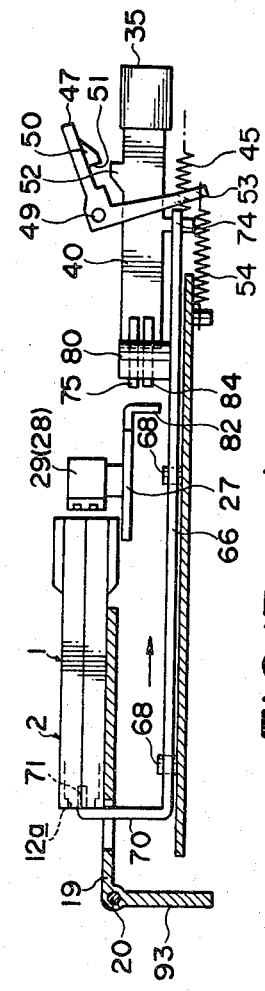
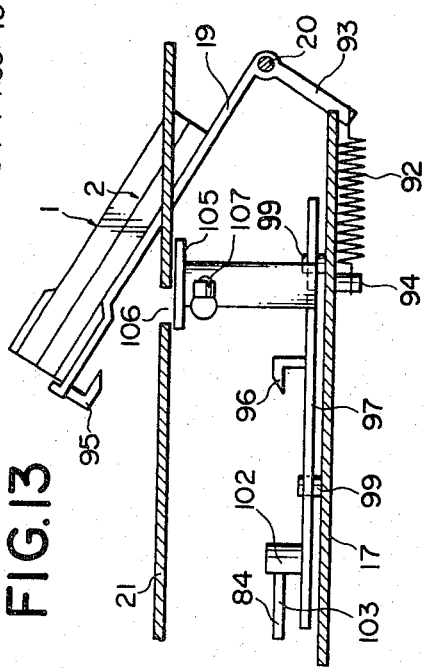

CASSETTE-TYPE RECORDING AND/OR REPRODUCING APPARATUS WITH INADVERTENT ERASE PREVENTING DEVICE

BACKGROUND OF THE INVENTION

1. Field of the Invention

This invention relates to an apparatus for recording and/or reproducing signals on a magnetic tape contained in a cassette having at least one aperture which is alternatively obstructed or unobstructed to respectively indicate that signals may be recorded on the tape or that the tape already has signals recorded thereon which are not to be erased, and more particularly is directed to an improved mode selecting mechanism of such recording and/or reproducing apparatus for preventing establishment of the recording mode of operation when the operatively positioned cassette has its aperture unobstructed.

2. Description of the Prior Art

Tape cassettes for use in recording and/or reproducing apparatus of the above described type are provided with at least one aperture in the peripheral wall of the cassette housing, and with a frangible tab which normally extends across each such aperture for obstructing the latter. When a tape cassette having its aperture obstructed by the respective frangible tab is operatively positioned in a recording and/or reproducing apparatus, either the recording or the reproducing mode of operation of the apparatus can be established by suitable actuation of its mode selecting mechanism. In the recording mode of operation, any signals previously recorded on the tape contained within the cassette are erased therefrom, and new signals are magnetically recorded on the tape. If it is desired to permanently retain the signals recorded on the tape contained in a cassette, the frangible tab is removed so as to leave the respective aperture unobstructed as an indication of that fact. Cassette-type recording and/or reproducing apparatus has been provided with an inadvertent erasing preventing device which detects an unobstructed aperture in an operatively positioned tape cassette and, in response thereto, prevents the establishment of the recording mode of operation by the mode selecting mechanism. Since the recording mode of operation cannot be established, inadvertent erasing of signals previously recorded on the tape is prevented.

In the existing inadvertent erasing preventing device, establishment of the recording mode of operation of the recording and/or reproducing apparatus is blocked by preventing movement of the record push-button that has to be actuated or depressed for establishing the recording mode of operation. In other words, when the inadvertent erasing preventing device detects an unobstructed aperture in an operatively positioned tape cassette, depressing or actuation of the record push-button of the mode selecting mechanism is prevented. However, when actuation or depression of the record push-button is blocked, as aforesaid, the user of the apparatus may not appreciate the significance of the resistance to movement of the record push-button and may seek to forcibly overcome the same with the result that the apparatus is damaged.

OBJECTS AND SUMMARY OF THE INVENTION

Accordingly, it is an object of this invention to provide a cassette-type recording and/or reproducing apparatus which overcomes the above described disadvantage of the existing apparatus.

More specifically, it is an object of this invention to provide a cassette-type recording and/or reproducing apparatus with an improved device for preventing inadvertent erasing of the tape contained in an operatively positioned cassette.

Another object is to provide a cassette-type recording and/or reproducing apparatus with an inadvertent erasing preventing device which cannot be damaged by misoperation thereof.

A further object is to provide a cassette type recording and/or reproducing apparatus, as aforesaid, in which a record push-button for selecting a recording mode of operation can be depressed or actuated when an operatively positioned cassette has its aperture either obstructed or unobstructed, but in which the apparatus is changed-over to its recording mode of operation in response to such actuation of the record push-button only when the operatively positioned cassette has its aperture obstructed.

Still another object is to provide a cassette-type recording and/or reproducing apparatus, as aforesaid, in which an operatively positioned tape cassette having an unobstructed aperture is ejected from its operative position in response to actuation of the record push-button.

A still further object is to provide a cassette-type recording and/or reproducing apparatus, as aforesaid, in which an indicator is made operative to indicate that an operatively positioned cassette has an unobstructed aperture in response to the actuation of the record push-button.

In accordance with an aspect of this invention, in an apparatus for recording and/or reproducing signals on a magnetic tape contained in a cassette having at least one aperture which is alternatively obstructed or unobstructed to respectively indicate that signals may be recorded on the tape or that the tape already has signals recorded thereon which are not to be erased, a detector is engageable with an operatively positioned cassette at the aperture of the latter and has first and second states in dependence on whether the aperture is obstructed or unobstructed, respectively, a record push-button is actuable from a rest position to an operative position with the detector in either of its states, a changeover mechanism changes-over the apparatus to its recording mode of operation upon actuation of the record push-button to its operative position with the detector in its first state thereof, and means are provided for preventing such change-over of the apparatus to the recording mode of operation when the record push-button is actuated to its operative position with the detector in its second state.

In accordance with additional features of this invention, an ejector is provided for ejecting the tape cassette from its operative position in response to actuation of the record push-button with the detector in its second state, and a lock, which is normally operative to hold the actuated record push-button in its operative or depressed position following actuation thereof, is released in response to the second state of the detector. Moreover, an indicator is made operative to indicate that the operatively positioned cassette has an unobstructed aperture in response to the actuation of the record push-button with the detector in its second state.

The above, and other objects, features and advantages of this invention, will be apparent from the following detailed description of illustrative embodiments thereof which is to be read in connection with the accompanying drawings.

BRIEF DESCRIPTION OF THE DRAWINGS

FIG. 2 is a top plan view of the apparatus shown on FIG. 1;

FIG. 3 is a side elevational view of the apparatus of FIG. 1 as viewed from the left-hand side of FIG. 2;

FIG. 4 is a side elevational view of the apparatus of FIG. 1, as viewed from the right-hand side of FIG. 2;

FIG. 12 is a side elevational view similar to that of FIG. 3, but for the condition of the apparatus illustrated on FIG. 11;

FIG. 13 is a side elevational view similar to that of FIG. 4, but for the condition of the apparatus illustrated on FIG. 11;

DESCRIPTION OF THE PREFERRED EMBODIMENTS

Figure 1:
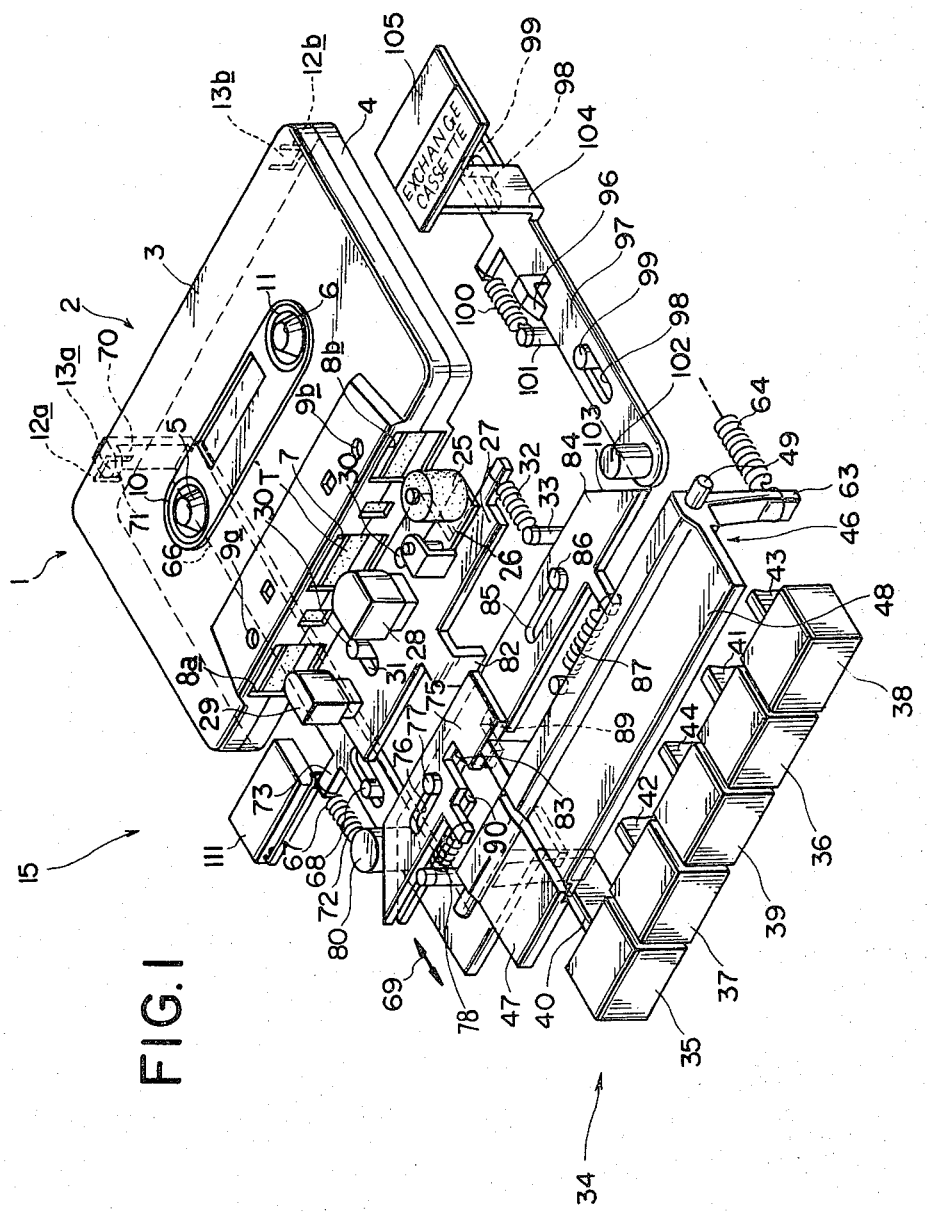
FIG. 1 is a perspective view of a cassette-type recording and/or reproducing apparatus according to an embodiment of this invention shown in its stop condition, and illustrating only those elements of the apparatus necessary to an understanding of the invention along with an operatively positioned tape cassette having an obstructed aperture for indicating that either recording or reproducing operations may be performed on the tape contained in such cassette.

Referring to the drawings in detail, and initially to FIGS. 1 and 2 thereof, it will be seen that a tape cassette 1 for use in a recording and/or reproducing apparatus in accordance with this invention generally comprises a cassette housing 2 of a synthetic resin having substantially rectangular top and bottom walls 3 and a peripheral wall 4 extending therebetween, a pair of reels 5 and 6 rotatably mounted in side-by-side relation within cassette housing 2, and a magnetic tape T wound on reels 5 and 6 and being suitably guided therebetween so as to follow a path having a run T′ extending along peripheral wall 4 at one long side of housing 2 which is hereinafter referred to as the front side of the housing. As shown particularly on FIG. 1, a central window 7 and side windows 8a and 8b disposed symmetrically at opposite sides of window 7 are provided in peripheral wall 4 at the front side of housing 2 so as to provide access to tape run T′ through such windows, and openings 9a and 9b are formed in top and bottom walls 3 at locations in back of side windows 8a and 8b, respectively, for selectively receiving a capstan of the recording and/or reproducing apparatus, as hereinafter described in detail. The top and bottom walls 3 also have laterally spaced openings 10 and 11 therein for providing access to the hubs of reels 5 and 6, respectively. Further, as shown in broken lines on FIG. 1, apertures 12a and 12b are formed in peripheral wall 4 adjacent the opposite ends of the rearwardly facing long side of housing 2, and frangible tabs 13a and 13b normally extend across and obstruct such apertures 12a and 12b, respectively.

The illustrated tape cassette 1 is of the type having plural record tracks on its tape T so that signals may be magnetically recorded or reproduced in certain of such tracks during movement of the tape from reel 5 to reel 6 with the cassette in the orientation shown on FIGS. 1 and 2, that is, with reel 5 to the left; whereas, signals may be magnetically recorded or reproduced in other record tracks on tape T when the cassette is inverted in its operative position so as to have reel 6 to the left and to cause movement of the tape from reel 6 to reel 5 during the recording or reproducing operation. In either orientation of cassette 1, it is the aperture 12a or 12b which is at the left-hand portion of the operatively positioned cassette housing, as viewed on FIG. 2, which is effective to determine whether a recording operation is permissible, that is, whether or not signals already recorded in the respective record track or tracks on tape T may be erased. Thus, if aperture 12a is obstructed by the respective tab 13a, that fact indicates that, with the operatively positioned cassette in the orientation shown, recording or reproducing operations may be performed in the respective record track or tracks of the tape. Similarly, if aperture 12b is obstructed by the respective tab 13b, recording or reproducing operations may be performed in the respective record track or tracks when the operatively positioned cassette is inverted to dispose aperture 12b at the left-hand portion of the cassette housing. Conversely, if either the frangible tab 13a or 13b is broken away or removed so as to leave the respective aperture 12a or 12b unobstructed, then only reproducing operations are to be performed on the tape when such unobstructed aperture is disposed at the effective position, that is, at the left-hand portion of the operatively positioned cassette.

An apparatus 15 for use in recording and/or reproducing signals on the magnetic tape T contained within the above described cassette 1 is shown to generally comprise a cassette holder 16 for supporting cassette 1 in an operative position in respect to a chassis 17 (FIGS. 3 and 4), and which may include locating pins or posts 18 extending upwardly from chassis 17 and suitably engaging the downwardly facing wall 3 of cassette housing 2 in the operative position of the cassette. The cassette holder 16 is further shown to include a cassette support plate 19 which is pivotally mounted in respect to chassis 17, as at 20, so as to be swingable between a horizontal operative position (FIGS. 3,4,8,10 and 12) in which the cassette housing 2 resting on plate 19 engageable with and exactly positioned by posts 18, and an upwardly inclined cassette receiving and discharging position (FIG. 13) in which the cassette 1 on support plate 19 extends upwardly through an opening in a top wall 21 of the apparatus housing to permit replacement of the tape cassette on support plate 19.

The apparatus 15 is shown to further comprise a conventional tape drive assembly that includes reel drive shafts 22 and 23 (FIGS. 3 and 4) extending above chassis 17 and reaching into the openings 10 and 11 of the operatively positioned cassette housing 2 for coupling with reels 5 and 6 within the cassette housing. The conventional tape drive assembly is further shown to include a capstan 24 (FIGS. 2 and 7) directed upwardly from the chassis so as to be received in the openings 9a or 9b of the operatively positioned cassette housing 2, and a pinch roller 25 adapted to extend into window 8a or 8b for cooperation with capstan 24 in driving the tape run T' therebetween during recording and reproducing operations of apparatus 15.

In the apparatus 15 being presently described, pinch roller 25 is mounted, by way of a pinch roller support lever 26, on a head carriage 27 which further carries a magnetic recording-reproducing head 28 and a magnetic erasing head 29. The head 28 is disposed for engagement with tape run T' of the operatively positioned cassette 1 through central window 7 and the erasing head 29 is disposed for engagement with tape run T' through one or the other of side windows 8a and 8b depending on the orientation of cassette 1. Head carriage 27 is mounted, for example, on pins 30 directed upwardly from chassis 17 and slidably received in elongated openings or slots 31 in carriage 27, for forward and rearward movement between an inoperative position (FIGS. 1,2 and 3) in which pinch roller 25 and heads 28 and 29 are spaced forwardly from the front side of the operatively positioned cassette 1, and an operative position (FIGS. 7 and 8) in which recording-reproducing head 28, erasing head 29 and pinch roller 25 project rearwardly into the respective windows 7,8a and 8b at the front side of the operatively positioned cassette and are engageable with tape run T'. A spring 32 is connected between head carriage 27 and an anchor 33 on chassis 17 for urging head carriage 27 forwardly to its inoperative position.

The apparatus 15 is further shown to comprise a push-button assembly 34 (FIGS. 1 and 2) disposed at the front of the apparatus and including a push-button 35 actuable for selecting the recording mode of operation of the apparatus, a push-button 36 actuable for selecting the normal forward or reproducing mode of operation of the apparatus, push-buttons 37 and 38 selectively actuable for selecting either the rewind or fast-forward mode of operation of the apparatus, and a push-button 39 which is actuable for halting a previously established recording, reproducing, rewind or fast-forward operation and returning the apparatus to its stop condition. The push-buttons 35-39 are shown to be mounted at the forward ends of actuating slides 40-44, respectively, which are suitably supported for forward and rearward rectilinear movement and urged forwardly by respective springs 45 (FIGS. 3,8 and 10) so as to dispose the respective push-buttons at their forward or rest positions. It will be apparent that each of push-buttons 35-39 can be depressed rearwardly or actuated against the force of the respective spring 45 so as to move from its rest position to a rearwardly displaced operative position, for example, as shown on FIGS. 7,8,11 and 12 in respect to the record push-button 35.

It will be appreciated that, when push-button 36 is depressed or actuated to its operative position, a conventional change-over mechanism (not shown) is activated by the respective slide 41 for moving head carriage 27 to its operative position and causing rotation of reel drive shaft 23 at a suitably slow speed for taking up the tape on the reel 5 or 6 of the operatively positioned cassette 1 which is coupled with reel drive shaft 23 while the tape is driven at its normal forward speed by the cooperation of pinch roller 25 with capstan 24. Further, in response to actuation of push-button 36, a reproducing circuit (not shown) is activated to cause head 28 to reproduce signals previously recorded on a track or tracks of tape T. On the other hand, when either the rewind push-button 37 or the fast-forward push-button 38 is depressed or actuated to its operative position, the conventional change-over mechanism is actuated by the respective slide 42 or 43 to permit head carriage 27 to remain in its forward or inoperative position while the reel drive shaft 22 or the reel drive shaft 23, respectively, is rotated at a relatively high speed for effecting the rapid winding of the tape onto the one of the reels 5 and 6 then coupled with shaft 22 or shaft 23, respectively. Since the previously mentioned change-over mechanism actuable by the slides 41,42 and 43 of push-buttons 36,37 and 38 for establishing the reproducing, rewind and fast-forward modes of operation of apparatus 15 bears no relationship to the present invention, such change-over mechanism is neither illustrated nor described herein for the sake of simplicity.

A locking assembly 46 is provided in apparatus 15 for selectively retaining each of push-buttons 35-38 in its operative position following the actuation thereof and thereby maintaining the selected recording, reproducing, rewind or fast-forward mode of operation, respectively, until such time as the stop push-button 39 is actuated for releasing the locking assembly 46 and thereby permitting the return of the previously actuated push-button 35-38 to its inoperative or rest position. In accordance with the present invention, the locking assembly 46 of apparatus 15 is shown to include a relatively short first locking plate 47 and a relatively long second locking plate 48 arranged side-by-side above actuating slide 40 and actuating slides 41-43, respectively, and being pivotally supported along the rearward edges of plates 47 and 48 on a common, suitably supported shaft 49. As shown on FIGS. 3,8 and 10, the underside of locking plate 47 is formed with an inclined ramp 50 terminating in a rearwardly facing shoulder 51 and riding over a nose 52 formed on the upper edge of actuating slide 40 when record push-button 35 is depressed to its operative position (FIG. 8) at which nose 52 engages against shoulder 51 for retaining push-button 35 in its operative position against the force of spring 45. An arm 53 depends from the side of locking plate 47 remote from locking plate 48, and a spring 54 is connected between the lower end of arm 53 and a suitable anchor on chassis 17 for pivotally urging locking plate 47 in the downward direction about shaft 49 and thereby maintaining engagement of shoulder 51 with nose 52 following actuation of record push-button 35. However, it will be apparent that locking plate 47 can ge pivoted or tilted upwardly against the force of spring 54, for example, as shown on FIG. 10, so as to release shoulder 51 of ramp 50 from nose 52 and thereby permit spring 45 to return push-button 35 to its inoperative or rest position following the actuation thereof.

Figure 5:
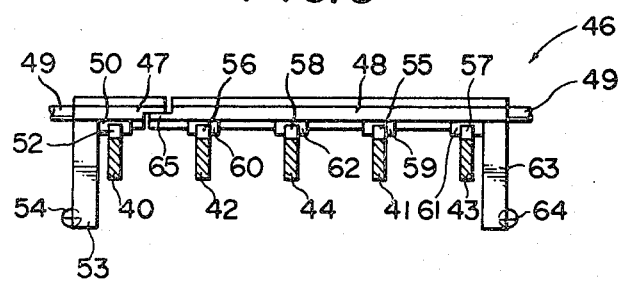
FIG. 5 is a front elevational view of a push-button locking assembly included in the apparatus of FIGS. 1-4.

The actuating slides 41-44 are shown to have noses 55-58, respectively, extending from their upper edges and each being similar to the nose 52 on actuating slide 40. The underside of locking plate 48 is formed with depending ramps 59,60 and 61 located for engagement with noses 55,56 and 57, respectively, and each being similar to ramp 50 of plate 47 so as to terminate in a rearwardly facing shoulder. Thus, following depression or actuation of push-button 36,37 or 38 to its operative position, the nose 55, 56 or 57 on the respective actuating slide is engageable by the rearwardly facing shoulder of the respective ramp 59,60 or 61 for retaining the actuated push-button in its operative position. The underside of locking plate 48 is also formed with an elongated ramp 62 which rides on nose 58 of actuating slide 44 in all positions of the respective stop push-button 39. As shown particularly on FIGS. 1 and 5, an arm 63 depends from locking plate 48 at the side of the latter remote from locking plate 47 and a spring 64 extends rearwardly from arm 63 to a suitable anchor on the chassis so as to yieldably urge locking plate 48 to pivot downwardly toward the underlying actuating slides 41-44. It will be apparent that, after either the normal forward or reproducing push-button 36, the rewind push-button 37 or the fast-forward push-button 38 has been actuated or depressed to its operative position to engage the respective nose 55,56 or 57 in back of the rearwardly facing shoulder of the respective ramp 59,60 or 61 and thereby lock or retain the depressed or actuated push-button in its operative position, the actuation of stop push-button 39 to its operative position, moves nose 58 along the respective ramp 62 so as to tilt locking plate 48 upwardly and thereby release the previously depressed push-button 36,37 or 38 for return to its rest position by the force of the respective spring 45.

In accordance with this invention, release of the locking action of locking plate 48 in respect to any one of push-buttons 36,37 and 38, that is, upward pivoting of locking plate 48 in response to actuation of stop push-button 39, is transmitted to locking plate 47 so as to release the locking action of the latter in respect to record push-button 35. More particularly, as shown, a tongue 65 extends laterally from the side of locking plate 48 adjacent locking plate 47 and engages under the adjacent edge portion of locking plate 47 so that upward tilting of locking plate 48 is transmitted to locking plate 47, whereas locking plate 47 can be upwardly tilted independently of locking plate 48. Thus, locking plate 47 can be upwardly tilted, as hereinafter described in detail, to prevent the locking or retaining of record push-button 35 in its operative position, while locking plate 48 remains free to lock or retain any one of push-buttons 36,37 and 38 in the operative position thereof.

In order to detect whether the effective aperture 12a or 12b of the operatively positioned cassette 1 is obstructed or unobstructed, apparatus 15 according to this invention has a detecting slide 66 extending under the left-hand portion of the operatively positioned cassette. Slide 66 is formed with elongated openings or slots 67 which slidably receive mounting pins 68 extending from chassis 17 so that detecting slide 66 is mounted for rectilinear movement in the forward and rearward direction, as indicated by the arrow 69. An extension 70 projects upwardly from the back end of slide 66 and terminates in a forwardly directed feeler or finger 71 which is disposed for engagement with cassette 1 at the effective aperture 12a or 12b thereof which is at the left-hand portion of the rearwardly facing side of cassette housing 2 in the operative position of the latter. A spring 72 is connected between a lateral projection 73 on detecting slide 66 and a suitable anchor on the chassis so as to urge detecting slide 66 in the forward direction.

It will be apparent that, if the effective aperture 12a or 12b of the operatively positioned cassette 1 is obstructed by the respective tab 13a or 13b, the feeler 71 of detecting slide 66 engages such tab 13a or 13b and thus holds detecting slide 66 rearwardly against the force of spring 72 in a first position or state (FIGS. 2). On the other hand, if the effective aperture 12a or 12b is unobstructed, that is, if the respective tab 13a or 13b has been removed therefrom, feeler 71 of detecting slide 66 is free to enter the effective aperture 12a or 12b and spring 72 causes forward movement of detecting slide 66 to a second position or state (FIG. 9).

Figure 9:
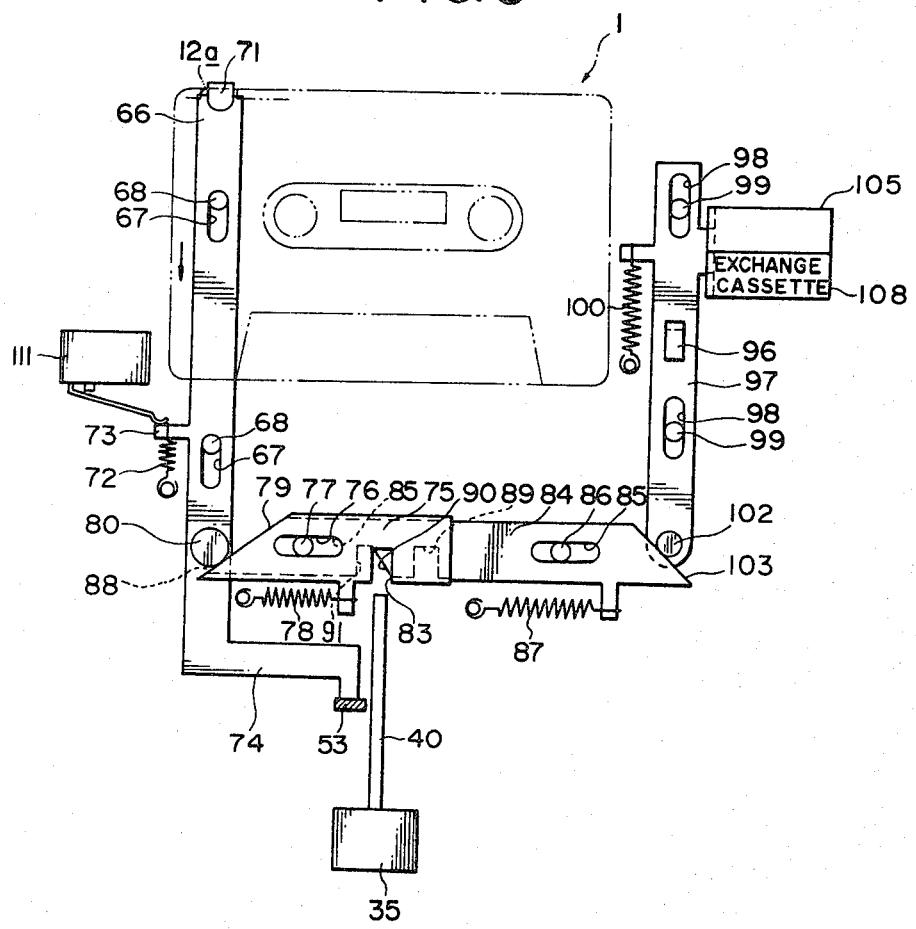
FIG. 9 is a top plan view of a portion of the apparatus of FIG. 2, but with the operatively positioned cassette having an unobstructed aperture for indicating that the tape contained in the cassette has signals recorded thereon which are not to be erased.

As shown particularly on FIGS. 2 and 9, detecting slide 66 has an extension 74 directed laterally inward from its forward end so as to reach in back of arm 53 depending from locking plate 47. When detecting slide 66 is retained in its rearward first position of state, extension 74 of the detecting slide is spaced rearwardly from arm 53 so as to permit locking plate 47 to lock or retain record push-button 35 in its operative position following the actuation thereof. However, when detecting slide 66 is displaced forwardly by spring 72 to its second position or state, extension 74 of the detecting slide acts forwardly against arm 53 for tilting locking plate 47 upwardly, as shown on FIG. 10, and thereby preventing the locking or retaining of record push-button 35 in its depressed or operative position.

Figure 7:
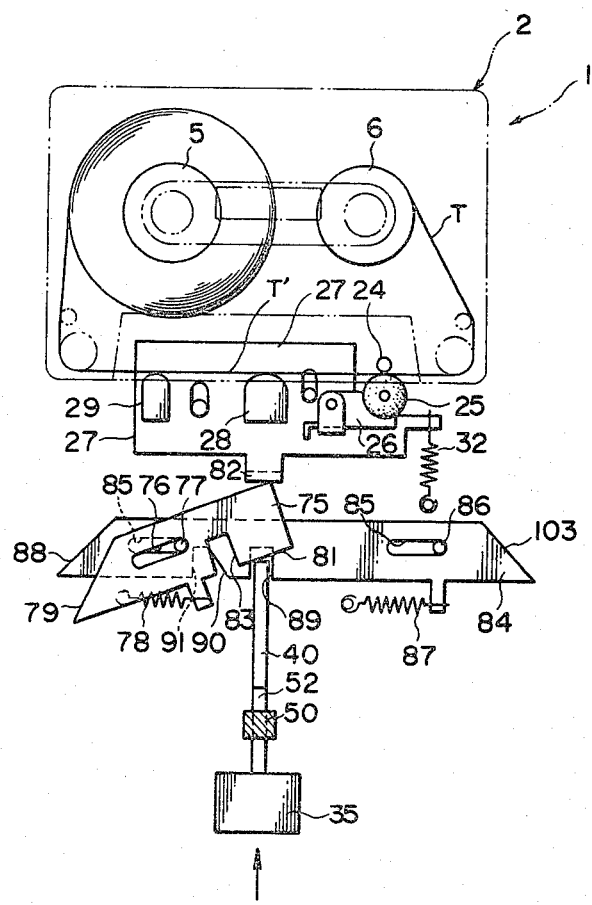
FIG. 7 is a top plan view of a portion of the apparatus of FIG. 2, but shown in its recording mode of operation.
Figure 8:
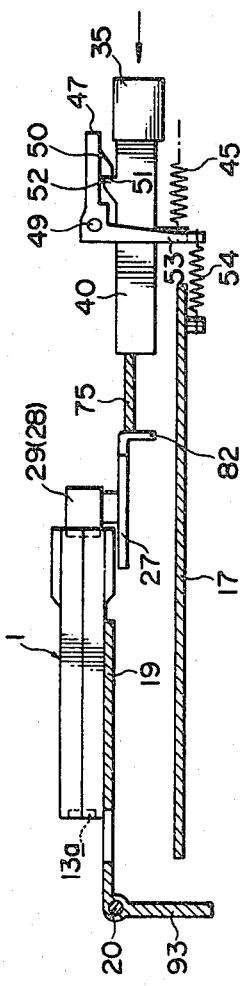
FIG. 8 is a side elevational view similar to that of FIG. 3, but showing the apparatus in its recording mode of operation.

As shown most clearly on FIGS. 1,2 and 9, a mechanism for changing-over the apparatus 15 according to this invention to its recording mode of operation includes a laterally elongated record selecting plate 75 disposed in front of head carriage 27 and having a longitudinally elongated opening or slot 76 which slidably receives a mounting pin 77 extending from the underlying chassis 17. Thus, record selecting plate 75 is mounted for rectilinear sliding movements in the lateral direction between an operative position (FIG. 2) and an inoperative position (FIG. 9), and also for turning movements about pin 77 (FIG. 7) when in its operative position. A spring 78 is connected between record selecting plate 75 and a suitable anchor on chassis 17 for urging plate 75 to move laterally toward the left, that is, toward its operative position. The left-hand end of plate 75 is formed with an oblique end edge 79 which is engageable by a roller 80 mounted on detecting slide 66. When detecting slide 66 is disposed in its rearward or first position or state, the engagement of roller 80 with oblique end edge 79 permits spring 78 to dispose record selecting plate 75 in its operative position (FIG. 2). On the other hand, when detecting slide 66 moves forwardly to its second position or state, the action of roller 80 on oblique end edge 79 displaces record selecting plate 75 toward the right to the inoperative position thereof (FIG. 9). When record selecting plate 75 is in its operative position, a forward edge portion 81 thereof extends across the back end of actuating slide 40 associated with record push-button 35. Thus, if record push-button 35 is depressed or actuated to its operative position with record selecting plate 75 in its operative position, the back end of actuating slide 40 acts against edge portion 81 of plate 75 for turning the latter in the counterclockwise direction about pin 77, as shown on FIG. 7. When plate 75 is thus turned in response to actuation of record push-button 35, plate 75 acts against an abutment 82 extending from the front of head carriage 27 for rearwardly displacing the latter to its operative position against the force of spring 32 (FIG. 7). Furthermore, record selecting plate 75 is shown to have a cutout 83 in its forward edge, with such cutout 83 being disposed for alignment with actuating slide 40 when plate 75 is in its inoperative position (FIG. 9). Accordingly, if record push-button 35 is actuated to its operative position while record selecting plate 75 is in its inoperative position, the back end portion of actuating slide 40 merely moves into cutout 83 (FIG. 11) without turning plate 75 and, therefore, head carriage 27 remains in its inoperative position.

Figure 11:
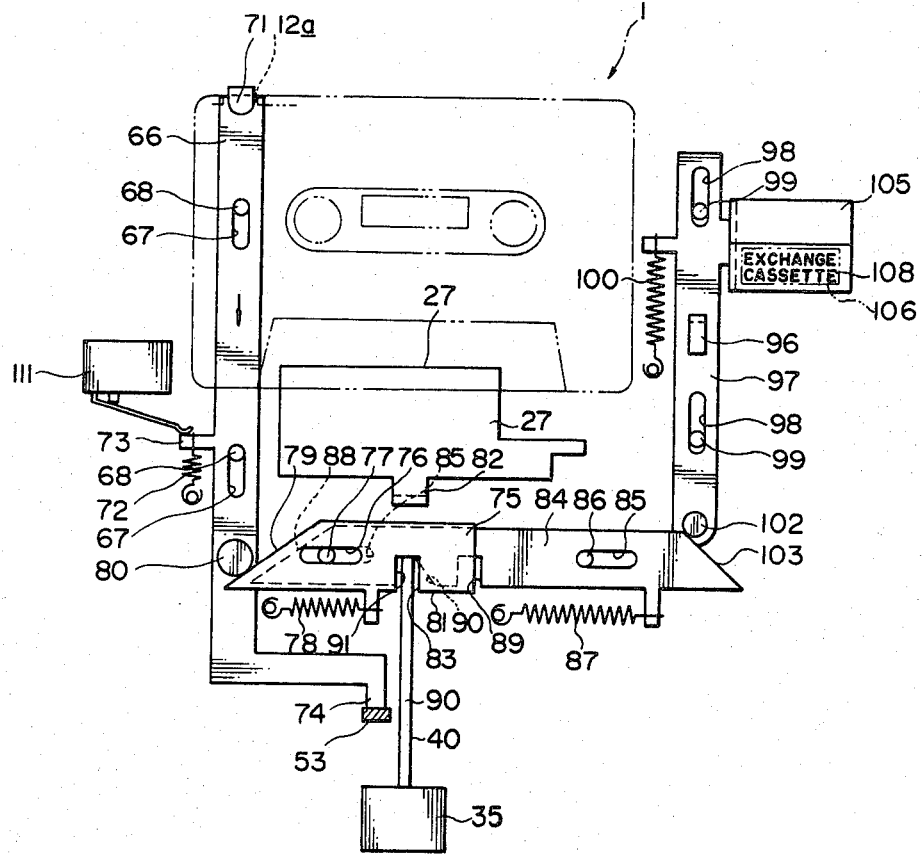
FIG. 11 is a top plan view similar to that of FIG. 9, but showing the condition of the illustrated parts of the apparatus when a record push-button thereof is depressed or actuated.

The apparatus 15 according to this invention is further shown to include a laterally elongated ejection control plate 84 disposed under record selecting plate 75 and having a pair of longitudinally elongated openings 85 which respectively receive the pin 77 and an additional pin 86 extending from chassis 17 at a location spaced laterally from pin 77. Thus, ejection control plate 84 is mounted for rectilinear sliding movement in the lateral direction. The ejection control plate 84 is urged toward the left by a spring 87, and the left-hand end of plate 84 has an oblique end edge 88 which is engageable by roller 80 on detecting slide 66. Therefore, in response to the movement of detecting slide 66 from its first position or state to its second position or state, ejection control plate 84 is moved from an inoperative position (FIGS. 2 and 7) to an operative position (FIGS. 9 and 11). The front edge of ejection control plate 84 has a cutout 89 therein, and such cutout 89 is located for alignment with actuating slide 40 when plate 84 is in its inoperative position (FIGS. 2 and 7). Thus, with ejection control plate 84 in its inoperative position, actuation of record push-button 35 merely moves the back end portion of the respective actuation slide 40 into cutout 89 and plate 84 remains undisturbed in its inoperative position. The ejection control plate 84 is further shown to have an obliquely arranged edge portion 90, for example, at the right-hand side of a trapezoidal cutout 91 in the front edge of plate 84, and such obliquely arranged edge portion 90 is spaced toward the left from cutout 89 so as to be disposed in back of actuating slide 40 when ejection control plate 84 is in its operative position (FIG. 9). Accordingly, when ejection control plate 84 is in its operative position and record selecting plate 75 is in its inoperative position as a result of the second state or position of detecting slide 66, the obliquely arranged edge portion 90 of ejection control plate 84 extends diagonally across cutout 83 of record selecting plate 75. Therefore, if record push-button 35 is actuated to its operative position with ejection control plate 84 in its operative position, the back end of actuating slide 40 acts against obliquely arranged edge portion 90 for further displacing ejection control plate 84 toward the right, as shown on FIG. 11.

In order to eject the cassette 1 from its operative position in response to such further displacement of ejection control plate 84 beyond its operative position, the apparatus 15 according to this invention includes a spring 92 connected between an arm 93 depending from cassette support plate 19 and a pin 94 on chassis 17 for yieldably urging cassette support plate 19 to its upwardly inclined cassette receiving and discharging position (FIG. 13). A keeper 95 depends from the forward portion of cassette support plate 19 adjacent the right-hand side of the latter and, in the horizontal operative position of support plate 19, is engageable by a latching element 96 (FIG. 4). The latching element 96 is mounted on a latch releasing slide 97 which has elongated openings 98 slidably receiving mounting pins 99 on chassis 17 so that latch releasing slide 97 is movable forwardly and rearwardly between a latching position (FIG. 4) and a latch releasing position (FIG. 13). In the latching position of slide 97, latching element 96 is engageable with keeper 95 for retaining cassette support plate 19 in its operative position against the force of spring 92. In the latch releasing position of slide 97 (FIG. 13), latching element 96 is released from keeper 95 to permit spring 92 to move support plate 19 to its cassette receiving and discharging position and thereby cause plate 19 to eject the tape cassette 1 from its operative position. A spring 100 is connected between latch releasing slide 97 and an anchor pin 101 on chassis 17 for yieldably urging slide 97 forwardly to its latching position (FIG. 2). A roller 102 projects upwardly from the forward end of latch releasing slide 97, and the adjacent or right-hand end of ejection control plate 84 is formed with an obliquely arranged end edge 103 which is spaced from roller 102 in the inoperative position of plate 84 (FIG. 2). However, during the previously described rightward displacement of ejection control plate 84 beyond its operative position, oblique end edge 103 engages roller 102 (FIG. 11) for moving latch releasing slide 97 rearwardly from its normal latching position to its latch releasing position.

An upright arm 104 extends from latch releasing slide 97 and, at its upper end, supports an indicating plate 105 which is thus movable forwardly and rearwardly with slide 97 below an opening 106 in top wall 21 of the apparatus housing (FIG. 4). A lamp or light source 107 is suitably energized in response to actuation of record push-button 35 and is disposed below indicating plate 105 which may be formed of a transparent or translucent material. As shown particularly on FIG. 2, indicating plate 105 has a blank rear portion registered with opening 106 when slide 97 is in its normal or latching position, and a forward portion provided with opaque indicia 108, for example, in the form of the words "EXCHANGE CASSETTE", and which registers with opening 106 when slide 97 is moved rearwardly to its latch releasing position (FIG. 11). Thus, when slide 97 is moved rearwardly to its latch releasing position for causing the ejection of cassette 1 from its operative position, indicia 108 appear at opening 106 and are clearly defined by illumination of the background thereof for advising the user of apparatus 15 that a recording operation may not be performed on the tape in the cassette then disposed in the apparatus.

Figure 6:
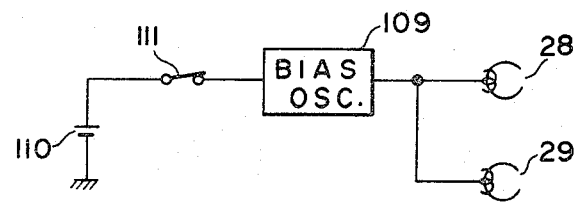
FIG. 6 is a circuit diagram of a circuit for controlling the supply of bias current to erasing and recording-reproducing heads in the apparatus of FIGS. 1-4.

As shown on FIG. 6, the apparatus 15 according to this invention is further provided with a bias oscillator 109 for supplying bias current to erasing head 28 and to recording-reproducing head 29 in the recording mode of operation of apparatus 15. Further, as shown, an electrical circuit for operating bias oscillator 109 from a voltage source 110 includes a normally open mocroswitch 111. As shown on FIGS. 1 and 2, microswitch 111 is suitably mounted adjacent detecting slide 66 so as to be actuated to its closed position by lateral projection 73 on detecting slide 66 when the latter is in its rearward or first position or stage. Thus, bias oscillator 109 is operated to supply bias current to heads 28 and 29 in the recording mode of operation of apparatus 15 only when the operatively positioned cassette 1 has its effective aperture 12a or 12b obstructed by the respective tab 13a or 13b for retaining detecting slide 66 in its rearward first position or state at which projection 73 actuates switch 111 to its closed position. On the other hand, when the effective aperture 12a or 12b of the operatively positioned cassette 1 is unobstructed so that spring 72 can move detecting slide 66 to its forward second position or state, projection 73 moves forwardly away from microswitch 111 (FIGS. 9 and 11) so that the latter opens to halt the operation of bias oscillator 109.

The above described recording and/or reproducing apparatus 15 according to this invention operates as follows:

When the cassette 1 operatively positioned in apparatus 15 has its effective aperture 12a obstructed by the respective tab 13a, as on FIGS. 1–3, feeler 71 engages such tab 13a so as to retain detecting slide 66 in its rearward first position or state against the force of spring 72. With detecting slide 66 in its rearward first position or state, extension 74 of slide 66 is spaced rearwardly from arm 53 on locking plate 47 so as to avoid interference with the locking action of the latter. Further, with slide 66 in its rearward first position or state, roller 80 thereon permits springs 77 and 87 to move record selecting plate 75 and ejection control plate 84 leftward to their operative and inoperative positions, respectively (FIGS. 1 and 2). With ejection control plate 84 in its inoperative position, spring 100 is effective to move slide 97 forwardly to its latching position in which latch element 96 engages keeper 95 on cassette support plate 19 for retaining the latter in its operative position (FIG. 4), and in which the blank portion of indicating plate 105 is displayed at opening 106. Moreover, with detecting slide 66 being retained in its rearward first position or state, projection 73 thereon actuates microswitch 111 so as to close the latter.

With the several parts of apparatus 15 conditioned as above in response to the obstruction of the effective aperture 12a in the operatively positioned cassette 1, which obstruction of aperture 12a indicates that it is permissible to record signals in the respective track or tracks on tape T, actuation of record push-button 35 to its operative position (FIGS. 7 and 8) produces the following sequence of events. Since extension 74 of detecting slide 66 does not act forwardly against arm 53 of locking plate 47, spring 54 can urge plate 47 downwardly to engage shoulder 51 thereon with nose 52 on actuating slide 40 for retaining or locking record push-button 35 in its operative position. During movement of push-button 35 to its operative position, the back end portion of actuating slide 40 moves into cutout 89 of ejection control plate 84 for leaving the latter undisturbed in its inoperative position. Further, during movement of push-button 35 to its operative position, the back end of actuating slide 40 bears against edge portion 81 of record selecting plate 75 for turning the latter about pin 77 (FIG. 7) against the force of spring 78, with the result that the back edge of plate 75 acts against abutment 82 on head carriage 27 for displacing the latter rearwardly to its operative position against the force of spring 32. Upon such movement of carriage 27 to its operative position, heads 28 and 29 enter windows 7 and 8a of the operatively positioned cassette for contacting the tape there exposed, and pinch roller 25 enters window 8b for pressing the tape against capstan 24 and thereby causing the forward movement of the tape at a predetermined running speed. Thus, apparatus 15 is changed-over to its recording mode of operation, in which any signals previously recorded on tape T are erased by head 29 and new signals are recorded on the tape by head 28.

When it is desired to terminate a recording operation of apparatus 15, that is, to change-over the apparatus from its recording mode to its stop mode, stop push-button 39 is actuated or depressed so as to effect rearward displacement of the associated actuating slide 44. During such rearward displacement of slide 44, nose 58 thereon acts against elongated ramp 62 at the underside of locking plate 48 for tilting the latter upwardly against the force of spring 64. Such upward tilting of locking plate 48 is transmitted to locking plate 47 by means of tongue 65, with the result that locking plate 47 is raised or tilted upwardly against the force of spring 54 for releasing shoulder 51 from nose 52 and permitting actuating slide 40 and record push-button 35 to be moved forwardly by the respective spring 45 for return of push-button 35 to its rest position. In response to such forward movement of actuating slide 40, spring 78 effects return turning of record selecting plate 75 in the clockwise direction about pin 77 to the position shown on FIG. 2 and spring 32 moves head carriage 27 forwardly to its inoperative position for withdrawing heads 28 and 29 and pinch roller 25 from the operatively positioned cassette 1. Thus, apparatus 15 is restored to its stop mode.

Figure 10:
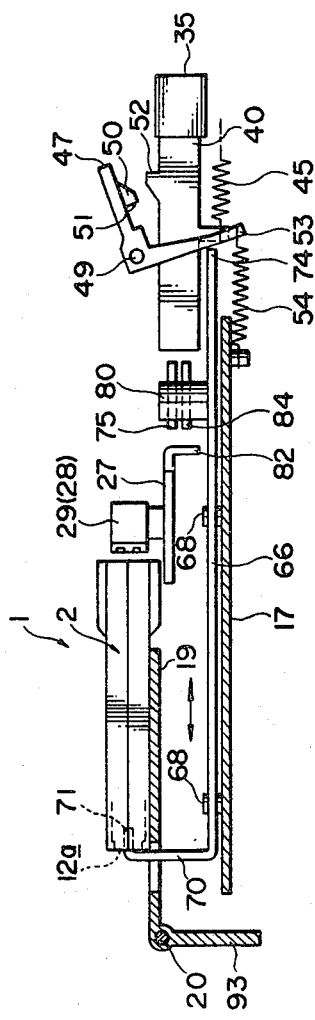
FIG. 10 is a side elevational view similar to that of FIG. 3, but for the condition of the apparatus illustrated on FIG. 9.

Referring now to FIGS. 9 and 10, it will be seen that, in the event that the cassette 1 disposed at the operative position thereof within apparatus 15 has the tab removed from its effective aperture 12a so that the latter is unobstructed for indicating that signals already recorded in the respective track or tracks of the tape are not to be erased, feeler 71 is free to enter aperture 12a. Accordingly, spring 72 urges detecting slide 66 forwardly to its second position or state in which projection 73 thereon is moved forwardly away from microswitch 111 so that the latter opens to prevent the operation of bias oscillator 109 and the supplying of bias current to heads 28 and 29. Further, in the second position or state of detecting slide 66, extension 74 thereof moves arm 53 forwardly against the force of spring 54 so as to retain locking plate 47 in its upwardly tilted position (FIG. 10).

Moreover, during the forward movement of detecting slide 66 to its second position or state, roller 80 thereon acts against oblique end edges 79 and 88 of record selecting plate 75 and ejection control plate 84 for displacing plates 75 and 84 toward the right against the forces of springs 78 and 87 and thereby disposing plates 75 and 84 in their inoperative and operative positions, respectively (FIG. 9). As a result of the foregoing positioning of plates 75 and 84, cutout 83 of record selecting plate 75 and oblique edge portion 90 of ejection control plate 84 are registered or aligned with the back end of actuating slide 40.

With the several parts of apparatus 15 positioned as described above in response to the second position or state of detecting slide 66, depression or actuation of record push-button 35 results in the following sequence of events. As actuating slide 40 moves rearwardly in response to actuation or depression of push-button 35, the back end portion of slide 40 merely moves into cutout 83 of record selecting plate 75 without turning the latter about pin 77 and, therefore, head carriage 27 remains in its forward or inoperative position (FIG. 11) with heads 28 and 29 and pinch roller 25 on such carriage 27 being withdrawn from the operatively positioned cassette 1. Further, during rearward movement of actuating slide 40, its back end acts against oblique edge portion 90 of ejection control plate 84 so as to further displace the latter toward the right from its operative position. In response to such further displacement of ejection control plate 84, the oblique end edge 103 thereof acts against roller 102 on latch releasing slide 97 for rearwardly displacing the latter to its latch releasing position. With slide 97 thus moved to its latch releasing position, latching element 96 thereon is disengaged from keeper 95 on cassette support plate 19 so that spring 92 is then effective to swing plate 19 to its upwardly tilted cassette receiving and discharging position for ejecting cassette 1 from its operative position in apparatus 15 (FIG. 13). Further, in response to movement of slide 97 to its latch releasing position, the indicia 108 on indicating plate 105 come into registration with the opening or window 106 in upper wall 21 of the apparatus housing for indicating to the user that the cassette 1 then in the apparatus, and which has been ejected from its operative position in response to actuation of the record push-button 35, is not suitable for a recording operation. Furthermore, since locking plate 47 is maintained in its upwardly tilted position by extension 74 of detecting slide 66 when the latter is in its second position or state (FIG. 12), shoulder 51 on locking plate 47 does not engage nose 52 on actuating slide 40 when record push-button 35 is depressed or actuated to its operative position. Therefore, when the user's finger pressed against push-button 35 for actuating or depressing the latter is withdrawn from push-button 35, the spring 45 associated with actuating slide 40 is operative to move the latter forwardly for restoring record push-button 35 to its rest position.

It will be apparent from the above description of the operation of recording and/or reproducing apparatus 15 according to this invention that, when a cassette 1 operatively positioned therein has its effective aperture 12a unobstructed, the record push-button 35 is free to be depressed or actuated, but change-over of the apparatus to its recording mode of operation does not occur in response to such actuation of push-button 35. Furthermore, upon such actuation of record push-button 35, the latter is not locked in its operative position, and the cassette is ejected from its operative position with a visual indication being simultaneously given to the user that another cassette should be employed for the desired recording operation.

It will be noted that the apparatus 15 described above with reference to FIGS. 1–13 employs a so-called "one touch" recording system, that is, the apparatus 15 is changed-over to its recording mode of operation in response to actuation of only the record push-button 35. However, as shown on FIGS. 14–18, the present invention is also applicable to a more conventional type of recording and/or reproducing apparatus 15A in which the various parts are identified by the same reference numerals employed for identifying the corresponding parts in apparatus 15, but with the letter "A" appended thereto, and further in which the recording mode of operation is established in response to actuation of both the record push-button 35A and the forward push-button 36A which, when actuated alone, establishes the reproducing mode of operation.

Figure 14:
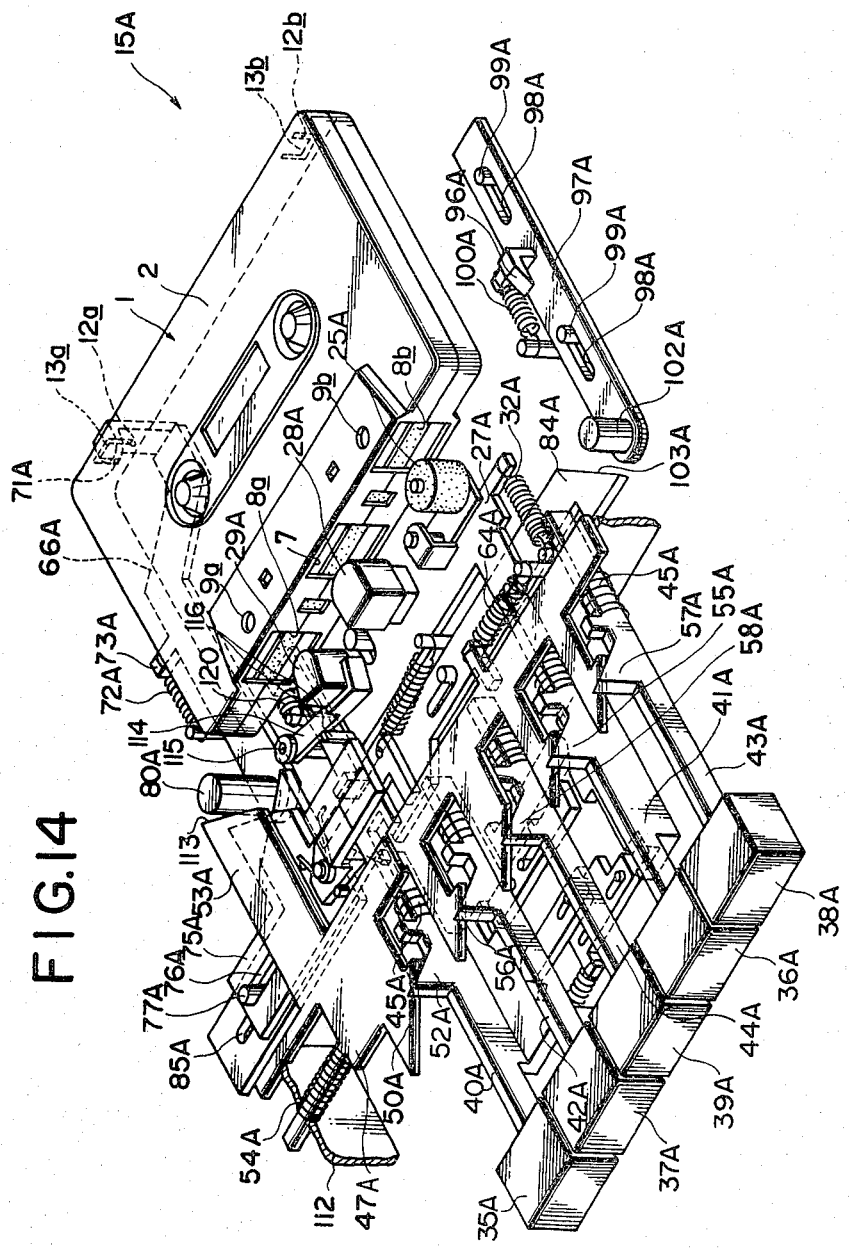
FIG. 14 is a perspective view similar to that of FIG. 1, but illustrating a cassette-type recording and/or reproducing apparatus according to another embodiment of this invention which is shown in its stop mode or condition.
Figure 15:
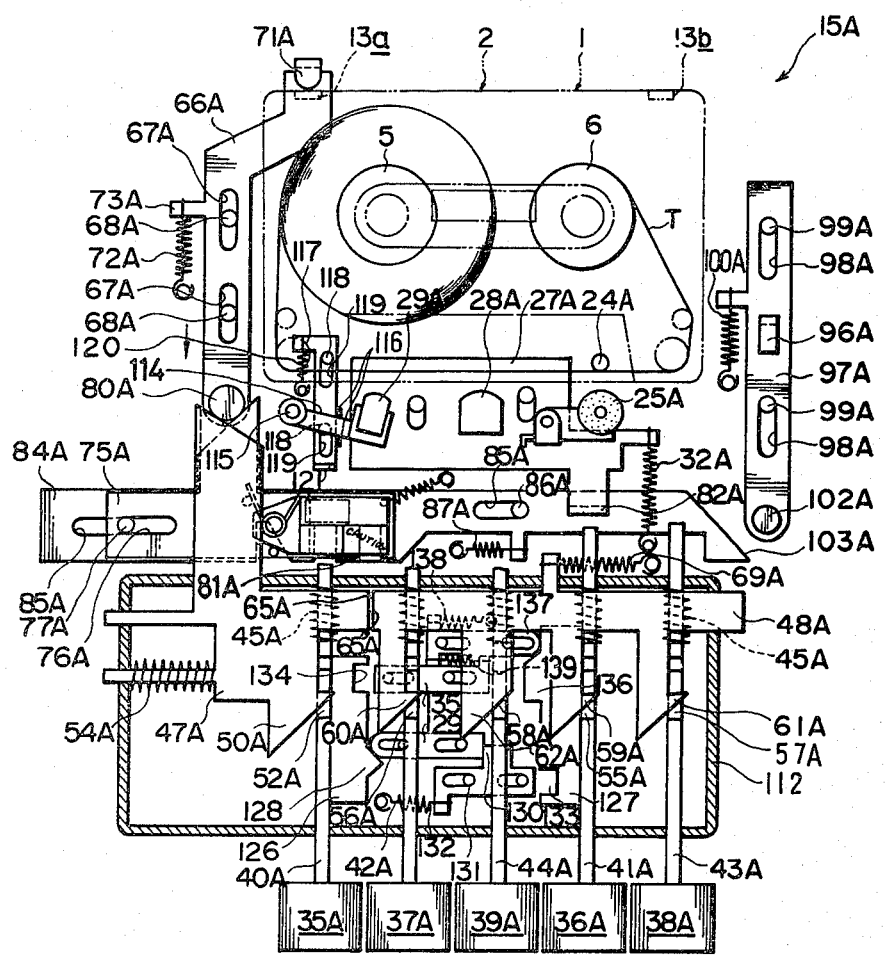
FIG. 15 is a top plan view of the apparatus of FIG. 14.

In the apparatus 15A, the actuating slides 40A–44A respectively associated with the push-buttons 35A–39A are longitudinally slidable in a sub-frame 112 and are urged forwardly by respective springs 45A for disposing the push-buttons 35A–39A in their respective rest positions (FIGS. 14 and 15). As shown most clearly on FIG. 17, the locking plates 47A and 48A of apparatus 15A are arranged side-by-side and are mounted in sub-frame 12 for lateral sliding movements relative to such sub-frame and relative to each other. Springs 54A and 64A act on locking plates 47A and 48A, respectively, for urging such locking plates toward the right, as viewed on FIG. 15. A side edge portion 65A of locking plate 48A is adapted to abut against an adjacent side edge portion 65'A of locking plate 47A so that lateral displacement of locking plate 48A in the leftward direction from the position shown on FIG. 15 is transmitted by abutting edge portions 65A and 65'A to cause similar leftward displacement of locking plate 47A. As shown most clearly on FIG. 17, locking plate 47A is formed with a laterally directed, oblique ramp 50A terminating in a rearwardly facing shoulder 51A and past which a nose 52A on the upper edge of actuating slide 40A (FIG. 14) is adapted to ride when record push-button 35A is depressed to its operative position (FIG. 16) at which nose 52A engages against shoulder 51A for retaining push-button 35A in its operative position against the force of the respective spring 45A. An arm 53A or extension of locking plate 47A is directed rearwardly from the latter and has an obliquely arranged back end edge 113 which is engageable by the roller 80A on the detecting slide 66A. It will be apparent that, when detecting slide 66A is moved by spring 72A from its rearward or first state or condition shown on FIGS. 15 and 16 to its forward or second state or condition shown on FIGS. 17 and 18, roller 80A acts against end edge 113 of extension 53A on locking plate 47A for laterally displacing plate 47A toward the left. When thus displaced toward the left, shoulder 51A on locking plate 47A is released from nose 52A on actuating slide 40A and thereby permits the respective spring 45A to return push-button 35A to its inoperative or rest position following the actuation thereof.

The actuating slides 41A–44A are shown (FIG. 14) to have noses 55A–58A, respectively, extending from their upper edges and each being similar to the nose 52A on actuating slide 40A. Further, locking plate 48A is formed with laterally directed, oblique ramps 59A, 60A and 61A each being similar to ramp 50A of plate 47A so as to terminate in a rearwardly facing shoulder, as shown most clearly on FIG. 17. The ramps 59A, 60A and 61A are located in the lateral direction so as to be engageable with noses 55A, 56A and 57A, respectively. Thus, following depression or actuation of push-button 36A, 37A or 38A to its operative position, the nose 55A, 56A or 57A on the respective actuating slide is engageable by the rearwardly facing shoulder of the respective ramp 59A, 60A or 61A for retaining the actuated push-button in its operative position. The locking plate 48A is also formed with a laterally directed oblique ramp 62A which is disposed for engagement by nose 58A on actuating slide 44A and which does not terminate in a shoulder similar to the shoulder 51A of ramp 50A. Thus, when stop push-button 39A is depressed to its operative position, nose 58A cooperates with ramp 62A for effecting leftward or lock-releasing displacement of locking plate 48A, but push-button 39A is not locked or retained in its operative position. Therefore, after the pressure applied to push-button 39A for actuating the latter is removed from push-button 39A, the spring 45A acting on the respective slide 44A is effective to return stop push-button 39A to its rest position. Further, it will be apparent that, after either the normal forward or reproducing push-button 36A, the rewind push-button 37A or the fast-forward push-button 38A has been actuated or depressed to its operative position to engage the respective nose 55A, 56A or 57A in back of the rearwardly facing shoulder of the respective ramp 59A, 60A or 61A and thereby lock or retain the depressed or actuated push-button in its operative position, the actuation of stop push-button 39A to its operative position moves nose 58A along the respective ramp 62A so as to displace locking plate 48A toward the left and thereby release the previously depressed push-button 36A, 37A or 38A for return to its rest position by the force of the respective spring 45A. As previously indicated, release of the locking action of locking plate 48A by leftward displacement thereof in response to actuation of stop push-button 39A is transmitted through abutting edge portions 65A and 65'A to locking plate 47A for effecting a similar leftward displacement of the latter and thereby releasing the locking action of plate 47A in respect to record push-button 35A.

Figure 16:
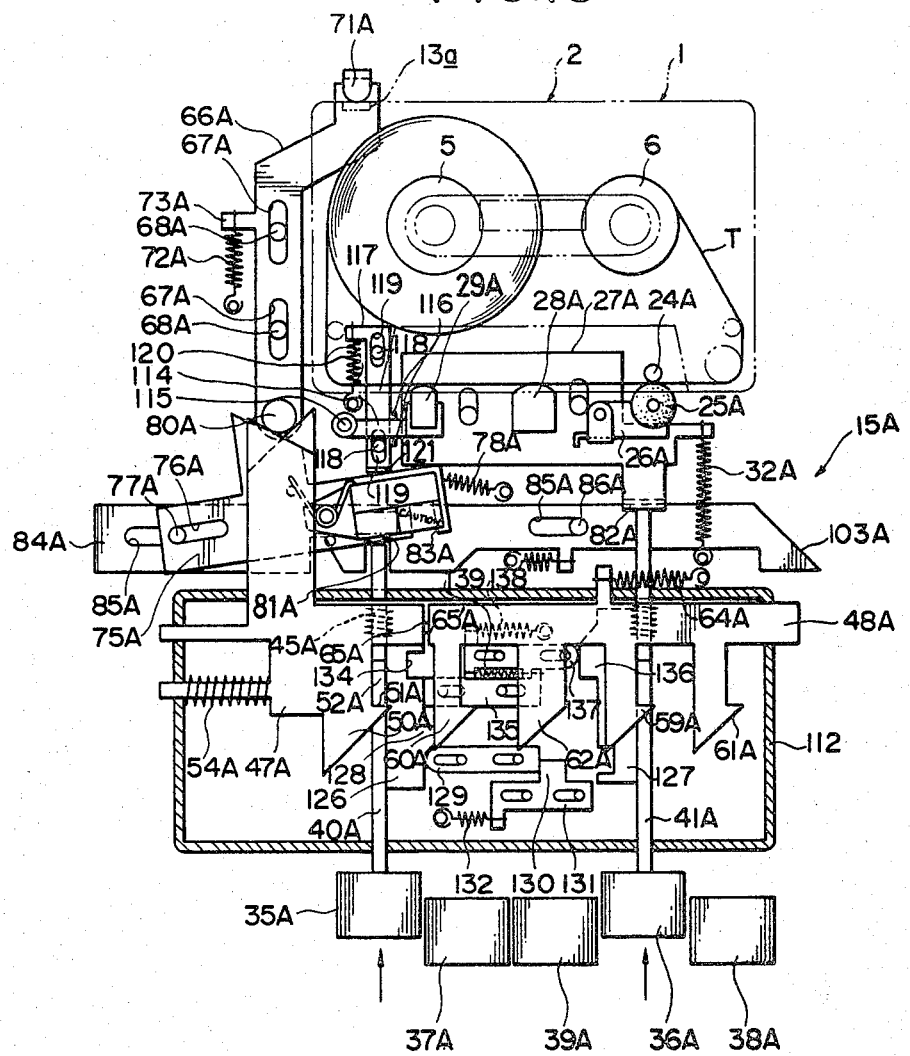
FIG. 16 is a top plan view similar to that of FIG. 15, but showing the apparatus when changed-over to its recording mode of operation.

As shown particularly on FIGS. 15 and 16, in the apparatus 15A, the abutment 82A by which head carriage 27A is moved rearwardly to its operative position is laterally located so as to be engageable by the back end of the actuating slide 41A associated with the forward push-button 36A. Therefore, in apparatus 15A, forward push-button 36A has to be actuated or depressed for causing the respective actuating slide 41A to effect rearward movement of head carriage 27A to its operative position against the force of spring 32A when changing-over apparatus 15A to either its recording mode of operation or its reproducing mode of operation. Further, in apparatus 15A, the recording-reproducing head 28A and the pinch roller 25A are mounted on head carriage 27A so as to be moved into windows 7 and 8B, respectively, of the operatively positioned cassette 1 (FIG. 14) whenever carriage 27A is moved to its operative position. However, erasing head 29A is mounted independently of carriage 27A so as to be moved to its operative position projecting into window 8a of the operatively positioned cassette only when apparatus 15A is changed-over to its recording mode of operation. More particularly, the erasing head 29A is shown to be mounted adjacent one end of a support arm 114 which, at its other end, is pivotally mounted on a pin 115 extending from the chassis. Support arm 114 is embraced by a fork 116 which is directed upwardly from an erasing head control slide 117. Slide 117 is mounted for longitudinal sliding movement in the forward and rearward direction, for example, by means of pins 118 slidably engaging in slots 119 in slide 117. A spring 120 is connected to slide 117 for urging the latter in the forward direction and thereby disposing erasing head 29A in its inoperative position (FIGS. 14 and 15) spaced from the operatively positioned cassette 1. A flange 121 is provided at the forward end of slide 117 and is engageable by the back edge of record selecting plate 75A when the latter is turned about mounting pin 77A (FIG. 16) for displacing slide 117 in the rearward direction and thereby causing movement of erasing head 29A to its active or operative position in which head 29A extends into window 8a of the operatively positioned cassette.

Figure 17:
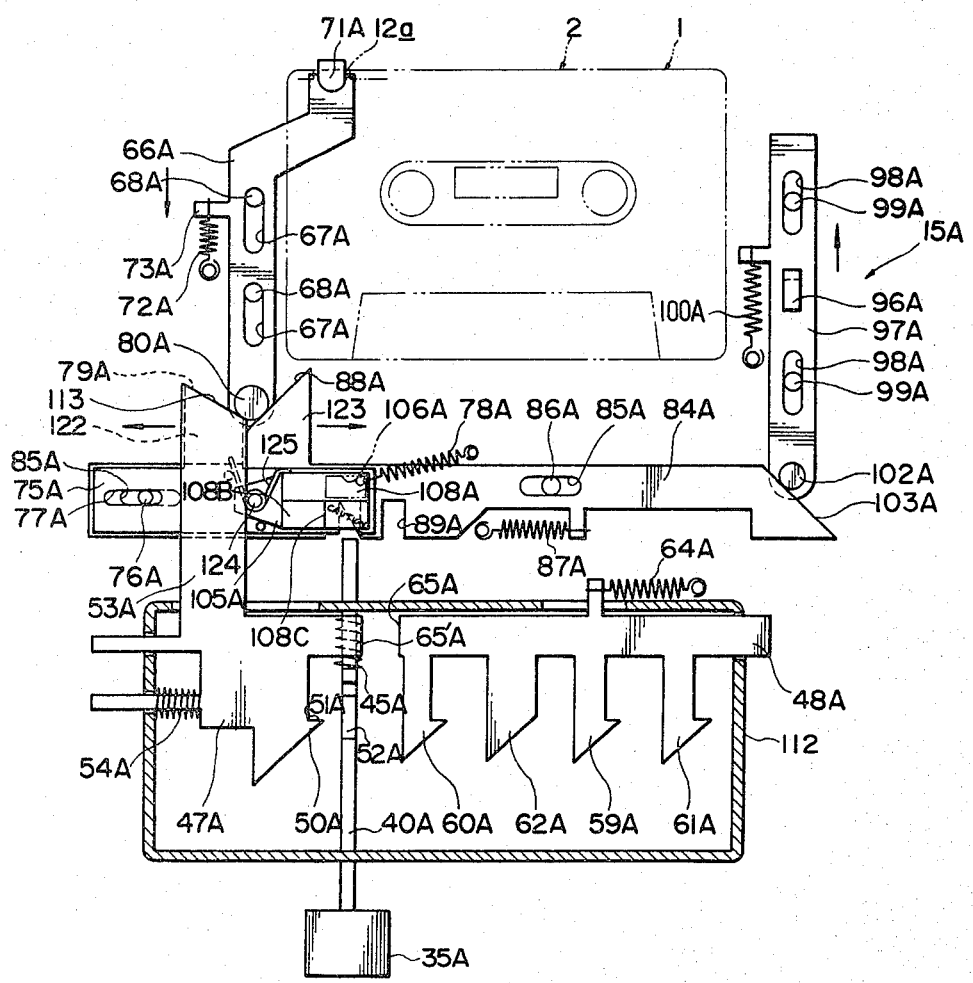
FIG. 17 is a top plan view similar to FIG. 15, but illustrating only those elements of the apparatus essential to an understanding of this invention and which are shown in the condition thereof when the operatively positioned cassette has an unobstructed aperture.
Figure 18:
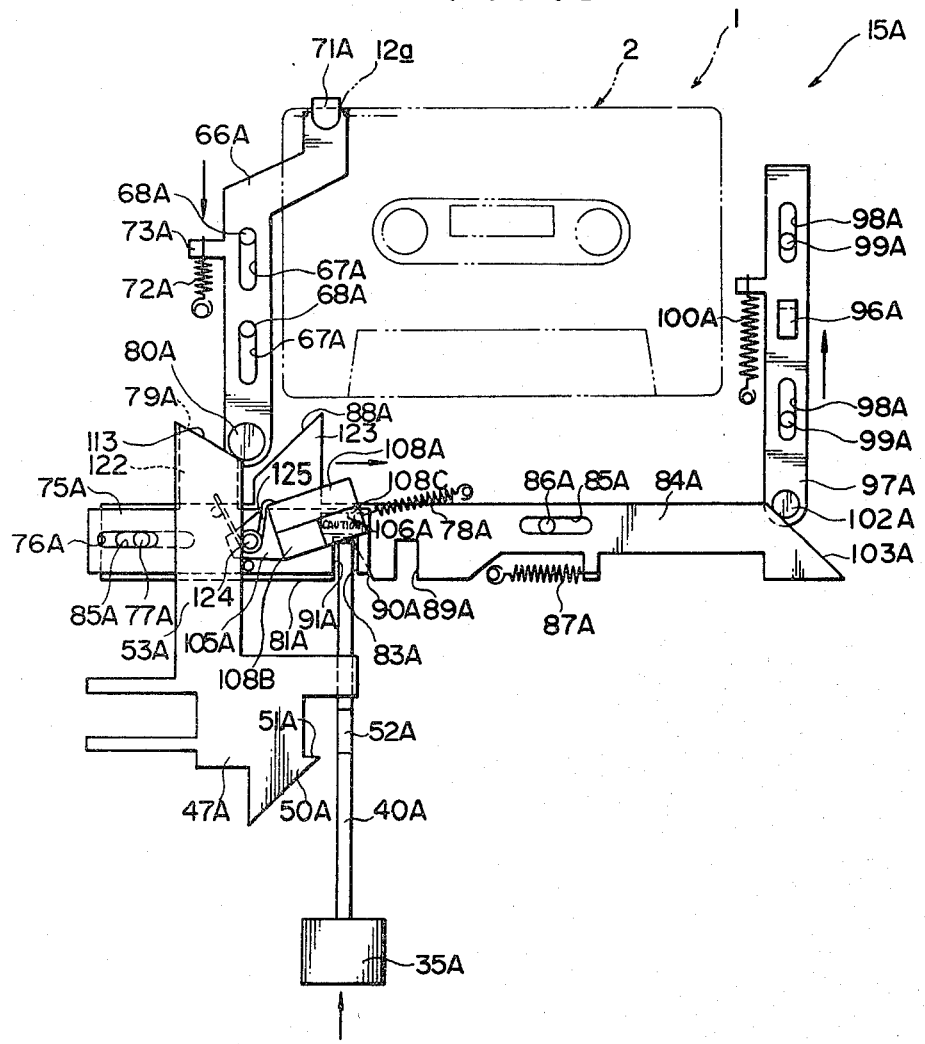
FIG. 18 is a view similar to that of FIG. 17, but showing the relationship of the several elements when a record push-button is depressed or actuated.

As in the previously described embodiment, the record selecting plate 75A or apparatus 15A has a single slot 76A slidably receiving the mounting pin 77A so as to mount plate 75A for laterally slidable movements between an operative position (FIG. 15) and an inoperative position (FIGS. 17 and 18), and for turning about mounting pin 77A when in its operative position (FIG. 16) for establishing the recording mode of operation. The ejection control plate 84A has longitudinally spaced apart slots 85A slidably receiving the mounting pin 77A and a mounting pin 86A so as to mount plate 84A for lateral sliding movements between an inoperative position (FIGS. 15 and 16) and an operative position (FIGS. 17 and 18). The plates 75A and 84A are shown to have respective rearwardly directed extensions 122 and 123 which terminate in the obliquely arranged end edges 79A and 88A, respectively, engageable by roller 80A on detecting slide 66A. Further, in apparatus 15A, the obliquely arranged end edges 79A and 88A are oppositely inclined or angled so that, when detecting slide 66A is moved forwardly from its first position or state (FIGS. 15 and 16) to its second position or stage (FIGS. 17 and 18), the action of roller 80A on obliquely arranged end edges 79A and 88A is effective to laterally displace record selecting plate 75A toward the left from its operative position to its inoperative position, and to laterally displace ejection control plate 84A toward the right from its inoperative position to its operative position. Since the record selecting plate 75A is laterally displaced toward the left in moving from its operative position to its inoperative position in apparatus 15A, the forward edge portion 81A of plate 75A which is engageable by actuating slide 40A in the operative position of plate 75A is disposed to the left of the cutout 83A which is aligned with actuating slide 40A in the inoperative position of record selecting plate 75A.

Further, in the apparatus 15A the indicating plate 105A is mounted on the record selecting plate 75A, rather than on the latch releasing slide 97A, as in the previously described embodiment. More particularly and as shown most clearly on FIGS. 17 and 18, indicating plate 105A is pivotally mounted, at one end, on a pivot pin 124 carried by plate 75A and is urged by a torsion spring 125 to a first position relative to plate 75A (FIG. 17) in which indicating plate 105A registers with the underlying portion of plate 75A and extends across the cutout 83A therein. Thus, as shown on FIG. 18, when record push-button 35A is actuated or depressed with record selecting plate 75A in its inoperative position so that the back end portion of actuating slide 40A moves into cutout 83A, the back end of slide 40A acts against the front edge of indicating plate 105A for turning or pivoting the latter to a second or canted position relative to record selecting plate 75A. Further, the surface of indicating plate 105A is divided into three indicating areas 108A, 108B and 108C which are selectively displayed or exposed at an overlying opening or window 106A in the top wall of the apparatus housing. The indicating area 108A extends across the rearward portion of plate 105A so as to be exposed at window 106A whenever indicating plate 105A is in its first position relative to record selecting plate 75A and the latter is not turned in response to actuation of record push-button 35A, and such area 108A may be colored green or provided with the words "PLAY BACK". The indicating area 108B is at the left-hand side of the forward portion of plate 105A so as to be exposed at window 106A only when record selecting plate 75A in its operative position is turned about mounting pin 77A in response to actuation of record push-button 35A (FIG. 16). The area 108B may be colored red or provided with the word "RECORD" thereon. The third indicating area 108C is at the right-hand side of the forward portion of plate 105A so as to be exposed at window 106A only when indicating plate 105A is turned to its second position relative to record selecting plate 75A in response to actuation of record push-button 35A with plate 75A in its inoperative position (FIG. 18). The area 108C may be provided with the word "CAUTION" or the words "EXCHANGE CASSETTE".

It will be noted that, in the apparatus 15A as so far described herein, the recording mode of operation is established by actuating the record push-button 35A and also the forward push-button 36A. If the operatively positioned cassette 1 has its effective aperture blocked or obstructed by the respective tab 13a, as on FIG. 16, so that detecting slide 66A is disposed in its rearward or first position or state, record selecting plate 75A and ejection control plate 84A are disposed in their operative and inoperative positions, respectively. In the foregoing situation, actuation of forward push-button 36A is effective to rearwardly displace head carriage 27A to its operative position so that recording-reproducing head 28A and pinch roller 25A enter the windows 7 and 8b of the operatively positioned cassette, while the actuation of record push-button 35A causes turning of the operatively positioned record selecting plate 75A and the latter rearwardly displaces slide 117 for moving erasing head 29A rearwardly to its operative position, in which such erasing head extends into window 7a of the operatively positioned cassette 1. Furthermore, since ejection control plate 84A is in its inoperative position, cassette 1 is not ejected from its operative position in apparatus 15A in response to the actuation of record push-button 35A. However, if the operatively positioned cassette 1 has its effective aperture 12a unobstructed, as on FIGS. 17 and 18, so that spring 72A moves detecting slide 66A forwardly to its second position or state, roller 80A on the detecting slide acts against oblique end edges 79A and 88A for displacing record selecting plate 75A and ejection control plate 84A to their inoperative and operative positions, respectively (FIG. 17). In the foregoing case, if forward push-button 36A is actuated prior to record push-button 35A, or if push-buttons 35A and 36A are simultaneously actuated for changing-over apparatus 15A to its recording mode of operation, the actuation of push-button 36A moves head 28A and pinch roller 25A into windows 7 and 8b of cassette 1 either before, or at the same time as the actuation of push-button 35A causes the back end of actuating slide 40A to act against the obliquely arranged edge portion 90A of ejection control plate 84A for further displacing the latter toward the right from its operative position and thereby displacing latch releasing slide 97A ot its latch releasing position. In such latch releasing position of slide 97A, the latching element 96A thereon is released from the keeper (not shown) on the cassette support plate (not shown) which, as in the case of the cassette support plate 19 of the first described embodiment, is spring urged for ejecting cassette 1 upwardly from its operative position. If such ejection of cassette 1 from its operative position occurs at a time when head 28A and pinch roller 25A extend into respective windows of the cassette, damage to head 28A, pinch roller 25A, head carriage 27A or the cassette 1 itself may result.

In order to avoid the above described problem, the apparatus 15A according to this invention is provided with an interlocking mechanism between actuating slides 40A and 41A associated with push-buttons 35A and 36A for ensuring a desired sequence of actuation of such push-buttons when selecting the recording mode of operation of the apparatus. More particularly, such interlock mechanism ensures that, when effecting change-over of apparatus 15A to its recording mode of operation, record push-button 35A has to be depressed to the extent sufficient to effect ejection of the cassette 1 from its operative position, if such ejection is to occur, prior to the actuation of forward push-button 36A. Further, the interlock mechanism prevents actuation of record push-button 35A at a time when forward push-button 36A has already been actuated to its operative position, for example, for establishing the playback or reproducing mode of operation of the apparatus.

As shown on FIGS. 15 and 16, an interlock mechanism capable of functioning in the above described manner comprises flanges 126 and 127 directed laterally toward each other from actuating slides 40A and 41A, respectively. Flange 126 on slide 40A has a triangular projection 128 extending therefrom and being located along flange 126 so that, in the rest position of push-button 35A (FIG. 15), triangular projection 128 is disposed in front of an adjacent end of an interlock slide 129. Interlock slide 129 extends laterally and is suitably mounted for longitudinal sliding movement in the lateral direction. The end of interlock slide 129 remote from flange 126 is engageable by a projection 130 on a second interlock slide 131 which is mounted for lateral sliding movement parallel to slide 129. A spring 132 is connected with slide 131 for urging the latter toward the left with the adjacent end of slide 129, and, through such engagement, maintaining contact of slide 129 with the edge of flange 126. Flange 127 on actuating slide 41A has a cutout 133 which is located to receive the adjacent end of interlock slide 131 when forward push-button 36A is in its forward or rest position. It will be apparent that, if push-buttons 35A and 36A are both initially in their respective rest positions (FIG. 15), actuation of record push-button 35A causes triangular projection 128 to ride past the adjacent end of slide 129 and to cause rightward displacement of slides 129 and 130 against the force of spring 132 until such time as push-button 35A is fully depressed (FIG. 16) to dispose triangular projection 128 in back of slide 129 and thereby permit spring 132 to return interlock slides 129 and 131 to their original positions. During the movement of push-button 35A from its rest position to its operative position, that is, during the movement of triangular projection 128 past interlock slide 129, the resulting rightward displacement of slides 129 and 131 causes the end of slide 131 to be engaged in cutout 133 of flange 127 for locking forward push-button 36A in its rest position. Thus, interlock slides 129 and 131 prevent the actuation of forward push-button 36A during the actuation of record push-button 35A until such time as the movement of the latter has been sufficient to cause ejection of the tape cassette from its operative position in the event that such tape cassette has its effective aperture 12a unobstructed for indicating that signals already recorded on the tape are not to be erased.

The flange 126 on actuating slide 40A is further shown to have a cutout 134 in its rear end portion which is located so that, in the rest position of push-button 35A, cutout 134 can receive an adjacent end portion of an interlock slide 135 which extends laterally and is mounted for sliding movement in the lateral direction. A trapezoidal projection 136 extends laterally from the back end portion of flange 127 on actuating slide 41A and is located so as to be disposed in front of the adjacent end of an interlock slide 137 (FIG. 15) when forward push-button 36A is in its rest position. The interlock slide 137 is also mounted for longitudinal sliding movement in the lateral direction, that is, parallel to the direction of movement of slide 135, and a spring 138 is connected with slide 137 for urging the latter toward the right, that is, into engagement with the edge of flange 127 on actuating slide 41A. Further, a spring 139 is connected between interlock slides 135 and 137 for urging slide 135 toward the left relative to slide 137 to a limited position (FIG. 15) in which respective abutments (not shown) on slides 135 and 137 are engageable with each other.

As shown on FIG. 15, when forward push-button 36A is in its rest position with projection 136 on flange 127 disposed in front of the adjacent end of slide 137, slide 135 is withdrawn from cutout 134 in flange 126 to permit the actuation of record push-button 35A to its operative position. However, when forward push-button 36A is depressed to its operative position with record push-button 35A in its rest position, for example, when selecting the reproducing or playback mode of operation of apparatus 15A, projection 136 engages the adjacent end of slide 137 for displacing the latter toward the left, and spring 139 effects a corresponding displacement of slide 135 for engaging the latter in cutout 134 so as to lock the record push-button 35A in its rest position. On the other hand, if record push-button 35A is depressed to its operative position while forward push-button 36A is in its rest position, cutout 134 moves rearwardly away from the adjacent end of interlock slide 135 so that, when push-button 36A is thereafter actuated or depressed for completing the change-over to the recording mode of operation, the engagement of projection 136 with slide 137 merely effects movement of the latter toward the left relative to slide 135 against the force of spring 139.

The above described recording and/or reproducing apparatus 15A according to this invention operates as follows:

When the cassette 1 operatively positioned in apparatus 15A has its effective aperture 12a obstructed by the respective tab 13a, as on FIGS. 14–16, feeler 71A engages such tab 13a so as to retain detecting slide 66A in its rearward first position or state against the force of spring 72A. With detecting slide 66A in its rearward first position or state, roller 80A thereon permits spring 54A to move locking plate 47A toward the right so as to avoid interference with the locking action of plate 47A. Further, with slide 66A in its rearward first position or state, roller 80A thereon permits springs 77A and 87A to move record selecting plate 75A and ejection control plate 84A toward the right and left to their operative and inoperative positions, respectively (FIG. 15). With ejection control plate 84A in its inoperative position, spring 100A is effective to move slide 97A forwardly to its latching position in which latch element 96A is effective, in the same manner as the latch element 96 of apparatus 15, to prevent ejection of cassette 1 from its operative position.

With the several parts of apparatus 15A conditioned as described above and shown on FIG. 15 in response to the obstruction of the effective aperture 12a in the operatively positioned cassette 1, actuation of record push-button 35A to its operative position (FIG. 16) produces the following sequence of events. During rearward movement or actuation of record push-button 35A to its operative position, nose 52A on the respective actuating slide 40A rides past ramp 50A on locking plate 47A until, in the operative position of push-button 35A, nose 52A engages in back of shoulder 51A for locking or retaining push-button 35A in its operative position. During movement of push-button 35A to its operative position, the back end portion of actuation slide 40A moves into cutout 89A of ejection control plate 84A for leaving the latter undisturbed in its inoperative position. Further, during movement of push-button 35A to its operative position, the back end of actuating slide 40A bears against edge portion 81A of record selecting plate 75A for turning the latter about pin 77A (FIG. 16) against the force of spring 78A with the result that the back edge of plate 75A acts against flange 121 on slide 117 for displacing the latter rearwardly against the force of spring 120. As a result of the rearward displacement of slide 117, the fork 116 thereon causes turning of support arm 114 about pin 115 in the counter-clockwise direction. Such turning of arm 114 moves erasing head 29A rearwardly to its operative position extending into window 7a of the operatively positioned cassette 1. Furthermore, during the turning of record selecting plate 75A, indicating plate 105A is turned therewith for displaying its indicating area 108B at window 106A and thereby indicating that the operatively positioned cassette 1 is suitable for the recording of signals on the tape contained therein. Following the actuation of record push-button 35A to its operative position, during which actuation triangular projection 128 has moved past interlock slide 129, forward push-button 36A can be depressed or actuated for completing the change-over of apparatus 15A to its recording mode of operation. During the actuation or rearward movement of push-button 36A, nose 55A on the respective actuating slide 41A moves past ramp 59A on locking plate 48A and then is engaged with the rearwardly facing shoulder in which ramp 59A terminates for locking or retaining push-button 36A in its operative position. Further, during the actuation of push-button 36A to its operative position, the back end of actuating slide 41A acts against abutment 82A on head carriage 27 for moving the latter rearwardly to its operative position. In such operative position of head carriage 27A, head 28A and pinch roller 25A enter the windows 7 and 8b of the operatively positioned cassette 1. Thus, apparatus 15A is changed-over to its recording mode of operation in which any signals previously recorded on tape T are erased by head 29A and new signals are recorded on the tape by head 28A while the tape is advanced at a predetermined running speed by the cooperative action of capstan 24A with pinch roller 25A.

When it is desired to terminate a recording operation of apparatus 15A, stop push-button 39A is actuated or depressed to effect rearward displacement of the associated actuating slide 44A. During such rearward displacement of slide 44A, nose 58A thereon acts against ramp 52A of locking plate 48A for displacing the latter toward the left against the force of spring 64A and thereby releasing the locking action of locking plate 48A in respect to actuating slide 41A so that the respective spring 45A is then operative to return push-button 36A forwardly to its rest position. In response to the forward movement of actuating slide 41A with push-button 36A, spring 32A becomes effective to move head carriage 27A forwardly to its inoperative position and, accordingly, head 28A and pinch roller 25A are withdrawn forwardly from the respective windows 7 and 8b in the operatively positioned cassette 1. Furthermore, the leftward or lock releasing movement of locking plate 48A is transmitted through abutting edges 65A and 65'A to locking plate 47A so that the latter is similarly displaced toward the left against the force of spring 54A. Such leftward displacement of locking plate 47A releases its locking action in respect to actuating slide 40A so that the respective spring 45A then becomes effective to forwardly displace slide 40A and return push-button 35A to its rest position. In response to such forward movement of actuating slide 40A, spring 78A effects return turning of record selecting plate 75A in the clockwise direction about pin 77A to the position shown on FIG. 15, and spring 120 moves slide 117 forwardly for similarly turning support arm 114 in the clockwise direction and thereby moving erasing head 29A to its inoperative position withdrawn from window 7a of the operatively positioned cassette. Thus, apparatus 15A is restored to its stop mode.

Referring now to FIG. 17, it will be seen that, in the event that the operatively positioned cassette 1 has the tab removed from its effective aperture 12a so that the latter is unobstructed for indicating that signals already recorded in the respective track or tracks of the tape are not to be erased, feeler 71A is free to enter aperture 12a. Accordingly, spring 72A urges detecting slide 66A forwardly to its second position or state in which roller 80A thereon acts against end edge 113 on the extension 53A of locking plate 47A for displacing the latter toward the left against the force of spring 54A. In such displaced position of locking plate 47A, ramp 50A and shoulder 51A thereof are laterally displaced out of the path of travel of nose 52A on actuating slide 40A. Further, during the forward movement of detecting slide 66A to its second position or state, roller 80A thereon acts against oblique end edges 79A and 88A for displacing the respective plates 75A and 84A toward the left and right, respectively. Thus, record selecting plate 75A and ejection control plate 84A are disposed in their inoperative and operative positions, respectively. As a result of the foregoing positioning of plates 75A and 84A, cutout 83A of plate 75A and oblique edge portion 90A of ejection control plate 84A are registered or aligned with the back end of actuating slide 40A.

With the several parts of apparatus 15A positioned as described above in response to the second position or state of detecting slide 66A, depression or actuation of record push-button 35A results in the following sequence of events. As actuating slide 40A moves rearwardly in response to actuation of push-button 35A, the back end portion of slide 40A merely moves into cutout 83A of record selecting plate 75A without turning the latter about pin 77A and, therefore, slide 117 is not displaced rearwardly so that erasing head 29A remains in its inoperative position. Further, during rearward movement of actuating slide 40A, its back end acts against indicating plate 105A for turning the latter relative to the inoperatively positioned record selecting plate 75A, with the result that the indicating area 108C of plate 105A is exposed at window or opening 106A for indicating to the user that the cassette 1 then in the apparatus is not suitable for a recording operation. Furthermore, during rearward movement of actuating slide 40A, its back end acts against oblique edge portion 90A of ejection control plate 84A so as to further displace the latter toward the right from its operative position (FIG. 18). In response to such further displacement of plate 84A, its oblique end edge 103A acts against roller 102A on slide 97A for rearwardly displacing the latter so that latch element 96A is released for permitting the ejection of cassette 1 from its operative position, as previously described with reference to apparatus 15. Since locking plate 47A is displaced toward the left by the engagement of roller 80A with oblique end edge 113 when detecting slide 66A is in its second position or state, nose 52A on slide 40A is not engaged by shoulder 51A for locking record push-button 35A in its operative position. Therefore, when the pressure applied to push-button 35A is removed from the latter, the spring 45A associated with actuating slide 40A is operative to restore record push-button 35A to its rest position.

Upon the appearance of indicating area 108C of indicating plate 105A at window 106A and the ejection of cassette 1 from its inoperative position in response to the actuation of record push-button 35A, the user of apparatus 15A will most likely appreciate that the ejected cassette is not suitable for the recording of signals on the tape contained therein and will exchange such cassette for one having its effective aperture obstructed or blocked. However, even if the user follows up the actuation of record push-button 35A by the actuation of forward push-button 36A, which is the only sequence of actuations of the push-buttons permitted by the interlock mechanism comprised of slides 129 and 131, the resulting movement of head carriage 27A to its operative position will occur after the ejection of cassette 1 from its operative position and, therefore, the operatively positioned head 28A and pinch roller 25A will not interfere with the ejecting movement of cassette 1 so as to give rise to the possibility of damage to head 28A and pinch roller 25A or to the cassette itself.

It will be apparent from the above description of operation of recording and/or reproducing apparatus 15A according to this invention that, as in the case of the previously described apparatus 15, when a cassette 1 operatively positioned in apparatus 15A has its effective aperture 12A unobstructed, the record push-button 35A is free to be depressed or actuated, but change-over of the apparatus to its recording mode of operation does not occur in response to such actuation of push-button 35A. Furthermore, upon such actuation of record push-button 35A, the latter is not locked in its operative position, and the cassette is ejected from its operative position with a visual indication being simultaneously given to the user that another cassette should be employed for the desired recording operation.

Although illustrative embodiments of this invention have been described in detail herein with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. An apparatus for recording and/or reproducing signals on a magnetic tape contained in a tape cassette having at least one aperture which is alternatively obstructed or unobstructed to respectively indicate that signals may be recorded on the tape contained on such cassette or that the contained tape already has signals recorded thereon which are not to be erased: said apparatus comprising cassette holding means for supporting a tape cassette in an operative position;

mechanical detecting means engageable with a tape cassette in said operative position at said aperture of the cassette and having first and second states in dependence on whether the aperture is obstructed or unobstructed, respectively;

a record push-button actuable from a rest position to an operative position to mechanically establish the recording mode of said apparatus, said record push-button being actuable to said operative position thereof with said mechanical detecting means in each of said first and second states thereof;

mechanical change-over means mechanically associated with said record push-button and said mechanical detecting means for changing-over said apparatus to a recording mode of operation thereof upon actuation of said record push-button to its operative position with said detecting means in said first state thereof; and mechanical means for preventing said changing-over of the apparatus to said recording mode of operation when said record push-button is actuated to its operative position with said detecting means in said second state of the latter.

2. An apparatus according to claim 1; further comprising locking means operative to retain said record push-button in said operative position of the latter, and means responsive to said second state of said detecting means to prevent operation of said locking means.

3. An apparatus according to claim 2; further comprising ejecting means operative to eject a tape cassette from said operative position of the latter, and means effecting operation of said ejecting means in response to the actuation of said record push-button to its operative position with said detecting means in said second state.

4. An apparatus according to claim 3; further comprising indicating means operative to indicate that the tape cassette in said operative position has its aperture unobstructed, and means for operating said indicating means in response to the actuation of said record push-button to its said operative position with said detecting means in said second state.

5. An apparatus according to claim 2; further comprising indicating means operative to indicate that the tape cassette in said operative position has its aperture unobstructed, and means for operating said indicating means in response to the actuation of said record push-button to its said operative position with said detecting means in said second state.

6. An apparatus according to claim 1; further comprising indicating means operative to indicate that the tape cassette in said operative position has its aperture unobstructed, and means for operating said indicating means in response to the actuation of said record push-button to its said operative position with said detecting means in said second state.

7. An apparatus according to claim 1; further comprising ejecting means operative to eject a tape cassette from said operative position of the latter, and means effecting operation of said ejecting means in response to the actuation of said record push-button to its operative position with said detecting means in said second state.

8. An apparatus according to claim 1; in which said change-over means includes a record selecting plate, means mounting said plate for rectilinear sliding and turning movements, said detecting means being engageable with said record selecting plate for effecting rectilinear sliding movement of the latter to operative and inoperative positions in response to said first and second states, respectively, of said detecting means, means responsive to actuation of said record push-button for turning said record selecting plate only when the latter is in said operative position, and means for establishing said recording mode of operation in response to said turning of the record selecting plate.

9. An apparatus according to claim 8; in which said means for turning the record selecting plate includes an actuating slide movable with said record push-button in a direction substantially perpendicular to said rectilinear sliding movements and being engageable against an edge of said record selecting plate for turning the latter upon said actuation of the record push-button, and said record selecting plate has a cutout in said edge thereof which, in said inoperative position of the record selecting plate, is aligned with said actuating slide for receiving the latter without turning of said record selecting plate upon said actuation of the record push-button.

10. An apparatus according to claim 9; further comprising ejecting means operative to eject a tape cassette from said operative position of the latter, an ejection control plate mounted for rectilinear sliding parallel with said rectilinear sliding of the record selecting plate and being also engageable by said detecting means for movement to inoperative and operative positions in response to said first and second states, respectively, of the detecting means, said ejection control plate having an edge portion which is obliquely arranged in respect to the direction of said rectilinear sliding of said ejection control plate and which, in said operative position of the ejection control plate, is engageable by said actuating slide to effect displacement of said ejection control plate upon actuation of said record push-button, interengageable means on said ejection control plate and said ejecting means for operating the latter in response to said displacement of the ejection control plate, and said ejection control plate further has a cutout in an edge thereof which, in said inoperative position of the ejection control plate, is aligned with said actuating slide for receiving the latter without displacement of said ejection control plate upon said actuation of the record push-button.

11. An apparatus according to claim 10; in which said detecting means includes a detecting slide mounted for rectilinear movement substantially at right angles to said rectilinear sliding of said record selecting plate and ejection control plate, a feeler on said detecting slide disposed to enter the unobstructed aperture of an operatively positioned cassette, spring means acting on said detecting slide to urge the latter to move in the direction for causing entry of said feeler into the unobstructed aperture, and interengageable means on said detecting slide and on said record selecting plate and ejection control plate for effecting movement of said record selecting plate to its said inoperative position and movement of said ejection control plate to its said operative position in response to movement of said detecting slide accompanying the entry of said feeler into the unobstructed aperture.

12. An apparatus according to claim 10; in which said cassette holding means includes a cassette support plate movable from a cassette receiving and discharging position to said operative position of the cassette; and in which said ejecting means includes spring means urging said support plate to said cassette receiving and discharging position, latch means for retaining said support plate in said operative position of the cassette, and means for releasing said latch means in response to said displacement of the ejection control plate.

13. An apparatus according to claim 1; in which an actuating slide is movable with said record push-button upon said actuation of the latter; and further comprising ejecting means operative to eject a tape cassette from said operative position of the latter, an ejection control plate mounted for rectilinear sliding substantially at right angles to the direction of movement of said actuating slide and being engageable by said detecting means for movement to inoperative and operative positions in response to said first and second states, respectively, of said detecting means, said ejection control plate having an edge portion which is obliquely arranged in respect to the direction of said rectilinear sliding of said ejection control plate and which, in said operative position of the ejection control plate, is engageable by said actuating slide to effect displacement of said ejection control plate upon actuation of said record push-button, interengageable means on said ejection control plate and said ejecting means for operating the latter in response to said displacement of the ejection control plate, and said ejection control plate further has a cutout in an edge thereof which, in said inoperative position of the ejection control plate, is aligned with said actuating slide for receiving the latter without displacement of said ejection control plate upon said actuation of the record push-button.

14. An apparatus according to claim 13; further comprising indicating means coupled with said ejecting means and being operative, upon operation of said ejecting means, to indicate that the tape cassette being ejected has its aperture unobstructed.

15. An apparatus according to claim 14; in which said cassette holding means includes a cassette support plate movable from a cassette receiving and discharging position to said operative position of the cassette; said ejecting means includes spring means for urging said support plate to return to said cassette receiving and discharging position, latch means for retaining said support plate in said operative position of the cassette, and a latch releasing slide engageable with said ejection control plate for movement in response to said displacement of the ejection control plate so as to release said latch means; and said indicating means is connected with said latch releasing slide so as to be made operative in response to said movement of the latch releasing slide.

16. An apparatus according to claim 1; further comprising indicating means coupled with said change-over means and being operative to provide an indication that a tape cassette in said operative position thereof has its aperture unobstructed when said record push-button is actuated with said detecting means in said second state.

17. An apparatus according to claim 16; in which said change-over means includes a record selecting plate, means mounting said plate for rectilinear sliding and turning movements, said detecting means being engageable with said record selecting plate for effecting rectilinear sliding movement of the latter to operative and inoperative positions in response to said first and second states, respectively, of said detecting means, an actuating slide movable with said record push-button and engageable against an edge of said record selecting plate for turning the latter upon said actuation of the record push-button with said record selecting plate in said operative position thereof, said record selecting plate having a cutout in said edge thereof which, in said inoperative position of the record selecting plate, is aligned with said actuating slide for receiving the latter without turning of said record selecting plate upon actuation of said record push-button, and means for establishing said recording mode of operation in response to said turning of the record selecting plate; and in which said indicating means is mounted on said record selecting plate and is movable relative to the latter by said actuating slide to provide said indication when said record push-button is actuated with said record selecting plate in said inoperative position of the latter.

18. An apparatus according to claim 1; further comprising first locking means operative to retain said record push-button in said operative position of the latter, means responsive to said second state of said detecting means for preventing operation of said first locking means, at least one additional push-button actuable from a rest position to an operative position for changing-over the apparatus to a respective mode of operation, second locking means operative to retain each said additional push-button in said operative position of the latter, means for displacing said second locking means so as to effect the release thereof, and means for transmitting the displacement of said second locking means to said first locking means so as to effect the release of the latter upon said release of the second locking means.

19. An apparatus according to claim 18; in which said first and second locking means include first and second pivotally mounted locking plates arranged side-by-side and being pivotally displaced in one direction for releasing the respective locking means; and in which said locking plates have overlapping portions at the adjacent sides thereof to constitute said means for transmitting the displacement of said second locking means to said first locking means.

20. An apparatus according to claim 18; in which said first and second locking means include first and second locking plates, respectively arranged side-by-side and being each displaceable sideways in one direction for releasing the respective locking means; and in which a side portion of said second locking plate abuts an adjacent side portion of said first locking plate in said one direction to constitute said means for transmitting the displacement of said second locking means to said first locking means.

21. An apparatus according to claim 1; further comprising ejecting means operative upon actuation of said record push-button with said detecting means in said second state for ejecting a tape cassette from said operative position of the latter; a head carriage carrying at least a recording-reproducing head and a pinch roller and being movable between an inoperative position, in which said head and roller are withdrawn from a cassette in said operative position of the latter, and an operative position of the carriage, in which said head and roller engage the tape in the cassette at the operative position of the latter; a forward push-button actuable from a rest position to an operative position for displacing said carriage to said operative position of the latter so that the change-over of the apparatus to said recording mode of operation is completed only upon the simultaneous disposition of said record and forward push-buttons at their respective operative positions; and interlock means preventing actuation of said record push-button to its operative position after actuation of said forward push-button from its rest position and being responsive to actuation of said record push-button from its rest position to prevent actuation of said forward push-button until said record push-button has been moved substantially to its operative position, whereby to prevent operation of said ejecting means with said head carriage in said operative position of the latter.

22. An apparatus according to claim 1; further comprising an erasing head and a recording-reproducing head engageable with the tape in a cassette in said operative position, a bias oscillator for supplying bias current to said erasing and recording-reproducing heads in said recording mode of operation, and an electrical circuit for operating said bias oscillator including switch means which is opened in response to said second state of the detecting means for preventing the operation of said bias oscillator and thereby halting the supplying of bias current to said heads.

* * * * *